(12) United States Patent
Vanderveen et al.

(10) Patent No.: US 11,373,522 B2
(45) Date of Patent: Jun. 28, 2022

(54) VEHICLE RANGING AND POSITIONING

(71) Applicant: QUALCOMM Incorporated, San Diego, CA (US)

(72) Inventors: Michaela Vanderveen, Tracy, CA (US); Hong Cheng, Basking Ridge, NJ (US); Sudhir Kumar Baghel, Hillsborough, NJ (US); Libin Jiang, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/113,840

(22) Filed: Dec. 7, 2020

(65) Prior Publication Data
US 2021/0110707 A1    Apr. 15, 2021

Related U.S. Application Data

(63) Continuation of application No. 16/244,422, filed on Jan. 10, 2019, now Pat. No. 10,861,327.
(Continued)

(51) Int. Cl.
*G08G 1/017* (2006.01)
*G01S 5/00* (2006.01)
(Continued)

(52) U.S. Cl.
CPC ............ *G08G 1/017* (2013.01); *G01S 5/0072* (2013.01); *G01S 5/0289* (2013.01); *G01S 13/74* (2013.01); *G01S 13/931* (2013.01); *G05D 1/00* (2013.01); *G06V 20/58* (2022.01); *G08G 1/09675* (2013.01); *G08G 1/096716* (2013.01); *G08G 1/096741* (2013.01); *G08G 1/096791* (2013.01); *H01Q 1/22* (2013.01); *H01Q 1/32* (2013.01);
(Continued)

(58) Field of Classification Search
None
See application file for complete search history.

(56) References Cited

U.S. PATENT DOCUMENTS 10,038,979 B1   7/2018  Jiang et al.
10,861,327 B2  12/2020  Vanderveen et al.
(Continued)

FOREIGN PATENT DOCUMENTS

WO    WO-2018106467 A1    6/2018

OTHER PUBLICATIONS

International Search Report and Written Opinion—PCT/US2019/013253—ISA/EPO—dated Apr. 9, 2019.

*Primary Examiner* — Christopher Braniff
(74) *Attorney, Agent, or Firm* — Danai Nelisile Mhembere; Holland & Hart LLP

(57) ABSTRACT

Methods, systems, and devices for ranging are described. A multi-phase distributed ranging technique includes transmitting and receiving vehicle information messages during a first time interval, where the vehicle information messages include at least a vehicle identifier and resource information. The multi-phase technique further includes transmitting and receiving ranging signals during a second time interval, and determining times of arrival of received ranging signals. A centralized ranging technique includes receiving resource assignments from an access point, transmitting ranging signals according to the resource assignments, and determining times of arrival of received ranging signals.

25 Claims, 15 Drawing Sheets

Related U.S. Application Data

(60) Provisional application No. 62/617,104, filed on Jan. 12, 2018.

(51) Int. Cl.
  *G01S 5/02* (2010.01)
  *G01S 13/74* (2006.01)
  *G01S 13/931* (2020.01)
  *G08G 1/0967* (2006.01)
  *G05D 1/00* (2006.01)
  *G06V 20/58* (2022.01)
  *H01Q 1/22* (2006.01)
  *H01Q 1/32* (2006.01)

(52) U.S. Cl.
  CPC .............. *G01S 2013/9316* (2020.01); *G01S 2013/9318* (2020.01); *G01S 2013/9319* (2020.01); *G01S 2013/93185* (2020.01)

(56) References Cited

U.S. PATENT DOCUMENTS

| | | |
|---|---|---|
| 2001/0053699 A1* | 12/2001 | McCrady ................. G01S 5/14 455/513 |
| 2005/0273258 A1 | 12/2005 | MacNeille et al. |
| 2008/0103696 A1 | 5/2008 | Cheok et al. |
| 2008/0234930 A1 | 9/2008 | Cheok et al. |
| 2016/0195600 A1 | 7/2016 | Feldman et al. |
| 2016/0277890 A1 | 9/2016 | Nallampatti Ekambaram et al. |
| 2017/0069207 A1 | 3/2017 | Ma |
| 2018/0252809 A1 | 9/2018 | Davis et al. |

\* cited by examiner

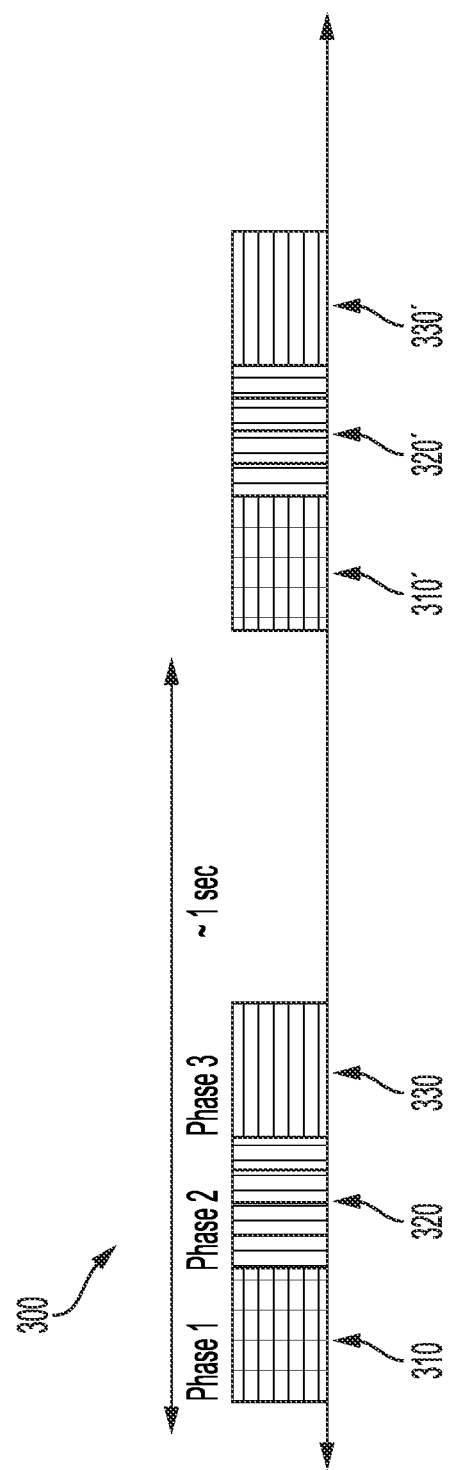

Vehicle 110-a database of ranging signal params

RangingID := 0x12345678

Antenna IDs: 0x1, 0x2, 0x3, 0x4

TX triplets (antenna, seqID, Resrc Indx)

(0x1, 0xa, 0x7a)
(0x2, 0xb, 0x1c)
(0x3, 0xd, 0x9f)
(0x4, 0xe, 0x2a)

RX Antenna ID:= 0x1

RangingID:= 0x55443322

MeasuredTOAs couplets: (antenna, ToA):(0xa, ToA1), (0xb, ToA2)

RangingID:= 0xabcd1111

MeasuredTOAs couplets: (antenna, ToA):(0x6, ToA3), (0x4, ToA4), (0x5, ToA5)

Database of vehicle 110-b ranging signals params:

RangingID := 0x55443322

Antenna IDs = 0xa 0xb

RsrcIndx 0x69, 0x41

SeqID 0xd 0x4

Database of vehicle 110-c ranging signals params:

RangingID := 0xabcd1111

Antenna IDs = 0x4 0x5

RsrcIndx 0x55 0x40

SeqID 0xc 0xf

RX Antenna ID:= 0x4

RangingID:= 0x55443322

MeasuredTOAs couplets: (antenna, ToA):(0xa, ToA1'), (0xb, ToA2')

RangingID:= 0xabcd1111

MeasuredTOAs couplets: (antenna, ToA):(0x6, ToA3'), (0x4, ToA4'), (0x5, ToA5')

FIG. 9

Vehicle 110-a database of ranging signal
params
RangingID := 0x12345678
Antenna IDs: 0x1, 0x2, 0x3, 0x4
TX triplets (antenna, seqID, Resrc Indx)
  (0x1, 0xa, 0x7a)
  (0x2, 0xb, 0x1c)
  (0x3, 0xd, 0x9f)
  (0x4, 0xe, 0x2a)

Database of neighbor's ranging signals
params:
RangingInfo :=
RangingID+AntennaID 0x55443322 0xa
0x55443322 0xb
RadioInfo:=
Resrc Indx, Seq ID
0x69 0xd
0x41 0x4

Database of neighbor's ranging signals
params:
RangingInfo :=
RangingID+AntennaID 0xabcd1111 0x6
0xabcd1111 0x4
0xabcd1111 0x5
RadioInfo:=
Resrc Indx, Seq ID RX Antenna ID:= 0x1
Send pairs of (RangingInfo, MeasuredToA)
  (0x55443322 0xa, ToA1)
  (0x55443322 0xb, ToA2)
  (0xabcd1111 0x6, ToA3)
  (0xabcd1111 0x4, ToA4)
  (0xabcd1111 0x5, ToA5)

RX Antenna ID:= 0x4
Send pairs of (RangingInfo, MeasuredToA)
  (0x55443322 0xa, ToA1')
  (0x55443322 0xb, ToA2')
  (0xabcd1111 0x6, ToA3')
  (0xabcd1111 0x4, ToA4')
  (0xabcd1111 0x5, ToA5')

FIG. 10

VEHICLE RANGING AND POSITIONING

CROSS REFERENCES

The present application for patent is a Continuation of U.S. Non-Provisional application Ser. No. 16/244,422 by VANDERVEEN, et al., entitled "VEHICLE RANGING AND POSITIONING," filed Jan. 10, 2019 which claims the benefit of U.S. Provisional Application No. 62/617,104 by VANDERVEEN, et al., entitled "VEHICLE RANGING AND POSITIONING," filed Jan. 12, 2018, both of which are assigned to the assignee hereof, and both of which are expressly incorporated by reference herein.

BACKGROUND

The following relates generally to ranging and positioning techniques; in particular to positioning techniques for accurate and precise positioning applications.

One emerging technology that requires precise positioning is autonomous vehicle operation. In order to operate vehicles safely in an autonomous (or partly autonomous) system, the position of the vehicle in an absolute sense, and with respect to objects in proximity to the vehicle, needs to be known accurately and with relatively high precision.

Some current positioning techniques provide location information that may not be sufficient for emerging technologies. For example, some autonomous driving systems target lane-level or better horizontal accuracy, with accurate attitude (orientation) estimation. The vehicle positioning systems need to provide sufficient precision in different operation scenarios, such as highway use, suburban use, remote use, or urban use. By contrast, current satellite positioning techniques can provide accuracy of roughly 2-3 meters in open-sky conditions and up to about 4 meters for more challenging conditions, such as urban canyon (city) environments. However, substantially higher accuracies may be needed for safe autonomous vehicle operation.

Some emerging autonomous vehicle systems use wireless communication protocols to enable safe operation. Systems in which vehicle communication systems communicate using wireless protocols are referred to as Vehicle to Everything (V2X) systems or Vehicle to Vehicle (V2V) systems.

SUMMARY

Methods, systems, and devices for positioning using wireless communication techniques are described.

In general, in one aspect, a wireless communication method comprises initiating a ranging process at a first vehicle and during a first time interval, transmitting a vehicle information message including ranging information for the first vehicle and radio information for the first vehicle. The ranging information comprises at least a vehicle identifier and the radio information comprises at least an indication of ranging signal transmission resources. The method further comprises, during the first time interval, receiving vehicle information messages from a plurality of neighbor vehicles, the plurality of neighbor vehicles including at least a first neighbor vehicle and a second neighbor vehicle. The vehicle information message from the first neighbor vehicle includes ranging information for the first neighbor vehicle and radio information for the first vehicle, and the vehicle information message from the second neighbor vehicle includes ranging information for the second neighbor vehicle and radio information for the second vehicle. The method further comprises at the first vehicle, during a second time interval, transmitting a ranging signal according to the radio information for the first vehicle, and at the first vehicle, during the second time interval, receiving a plurality of ranging signals including a ranging signal transmitted by the first neighbor vehicle and a ranging signal transmitted by the second neighbor vehicle. The method further comprises using the received radio information for the first neighbor vehicle, determining a time of arrival for the received ranging signal from the first neighbor vehicle and associating the time of arrival for the first neighbor vehicle with the ranging information for the first neighbor vehicle and using the received radio information for the second neighbor vehicle, determining a time of arrival for the received ranging signal from the second neighbor vehicle and associating the time of arrival for the second neighbor vehicle with the ranging information for the second neighbor vehicle.

The ranging information can comprise the vehicle identifier and an identification of one or more transmitting antennas of the vehicle. The radio information can comprise, for each of the one or more transmitting antennas, the ranging signal transmission resources and sequence identifiers, wherein each of the sequence identifiers identify a particular bit sequence to be transmitted. The sequence identifiers can be Zadoff Chu sequence identifiers, and the transmission resource information for the ranging signal can comprise resource indices for ranging signals transmitted from each of the one or more transmitting antennas of the vehicle.

The vehicle identifier can be a source Layer 2 Identifier (L2ID) or a RangingID parameter indicating the identity of the vehicle, and the identification of one or more transmitting antennas of the vehicle can be one or more AntennaID parameters each associated with a particular antenna of the vehicle. The vehicle identifier and the identification of one or more transmitting antennas of the vehicle can comprise a RangingInfo parameter associated with each transmitting antenna of the vehicle, the RangingInfo parameter indicating both the identity of the vehicle and the transmitting antenna. The second time interval can comprise a plurality of ranging sub-cycles, and wherein the radio information for the first vehicle comprises information indicative of a self-selected transmission slot included in a first sub-cycle of the second later time interval.

The time of arrival determination for received ranging signals can be performed using lower layer processing, wherein the lower layer processing comprises physical layer processing, media access control layer processing or both, and the method can further comprise accessing the determined time of arrival for the ranging signal and the associated vehicle identifier for the first neighbor vehicle and performing upper layer processing using the determined time of arrival for the first neighbor vehicle. The upper layer processing can comprise performing a ranging calculation to determine a range from the first vehicle to the first neighbor vehicle.

In general, in another aspect, a method of wireless communication for ranging comprises at a first vehicle, receiving radio assignments from an access point, the radio assignments for ranging transmissions from one or more transmitting antennas of the first vehicle. The method further comprises, during a ranging signal time interval, transmitting ranging signals from the one or more transmitting antennas according to time resources and transmission sequence information included in the radio assignments and receiving ranging signals transmitted by one or more neighbor devices using different transmission resources and different sequences than the first vehicle. The method further comprises determining times of arrival, transmission resources and sequence information of the received ranging signals and transmitting one or more time of arrival messages to the access point, the time of arrival messages including the received times of arrival and associated transmission resources and sequence information.

The one or more time of arrival messages can include, for each receive antenna of the first vehicle, a time of arrival message including an antenna identifier for the receive antenna and the received times of arrival and associated transmission resources and sequence information for ranging signals received at that receive antenna.

In some aspects the method can further comprise, prior to transmitting the time of arrival message, transmitting vehicle information to the access point, the vehicle information including at least a one information type selected from the group consisting of a vehicle identifier information, information indicative of one or more antenna location offsets for one or more vehicle antennas, and self-location information. The vehicle information can further comprise a device type.

In some aspects, receiving radio assignments from an access point comprises receiving one or more broadcast messages including the radio assignments for ranging transmissions from one or more transmitting antennas of the first vehicle, the one or more broadcast messages further including radio assignments for the one or more neighbor devices, and the time of arrival messages can further include a vehicle identifier associated with received times of arrival and associated transmission resources and sequence information.

In another aspect, receiving radio assignments from an access point comprises receiving one or more unicast messages including the radio assignments for ranging transmissions from one or more transmitting antennas of the first vehicle. Transmitting one or more time of arrival messages to the access point may comprise transmitting a message including a vehicle identifier for the first vehicle, information indicative of a location of the first vehicle during the ranging signal time interval, and for each received ranging signal, a set of time of arrival, sequence identifier, and transmission resource information. The one or more time of arrival messages are upper layer messages, and wherein the set of time of arrival, sequence identifier, and transmission resource information is a tuple of time of arrival, Zadoff Chu sequence ID, and transmission resource index. Determining times of arrival, transmission resources, and sequence information of the received ranging signals can be performed using lower layer processing, and the method may further comprise accessing the times of arrival, sequence information, and transmission resources for upper layer processing.

In general, in another aspect, a method at an access point comprises receiving device information from a plurality of devices for ranging, the plurality of devices including a first vehicle, determining radio information for transmitting ranging signals during a first ranging signal time interval for each of the plurality of devices, transmitting one or more radio assignment messages to the plurality of devices, the one or more radio assignment messages assigning determined radio information including transmission time resources and transmission sequences to one or more transmitting antennas of each of the plurality of devices. The method may further comprise receiving time of arrival messages from the plurality of devices, each of the time of arrival messages including times of arrival for received ranging signals at one or more receive antennas of the associated device and associated transmission resources and sequence information for the received ranging signals and determining a location of at least the first vehicle during the first ranging signal time interval using the time of arrival messages from the plurality of devices. The device information from a plurality of devices can include a device type for each of the plurality of devices, and the device information for the first vehicle can further comprise at least one information type selected from the group consisting of the first vehicle's identifier information, information indicative of location offsets for one or more antennas of the first vehicle, and self location information for the first vehicle.

In general, in another aspect a user equipment comprises memory circuitry and processor circuitry. The memory circuitry and processor circuitry are configured to initiate a ranging process at a first vehicle and generate a vehicle information message including ranging information for the first vehicle and radio information for the first vehicle, wherein ranging information comprises at least a vehicle identifier of the first vehicle and wherein the radio information comprises at least an indication of ranging signal transmission resources and an indication of a particular ranging signal bit sequence. The memory circuitry and processor circuitry can be further configured to initiate transmission of the vehicle information message during a first time interval and receive vehicle information messages from one or more sending neighbor vehicles during the first time interval, where the vehicle information messages include ranging information and radio information for the sending neighbor vehicle. The memory circuitry and processor circuitry can be further configured to initiate transmission of a wideband ranging signal according to the radio information for the first vehicle during a second time interval and receive ranging signals from the one or more sending neighbor vehicles during the second time interval, the received ranging signals comprising the particular ranging signal bit sequence for the sending neighbor vehicle sent on the ranging signal transmission resources for the sending neighbor vehicle. The processor circuitry and memory circuitry can be further configured to determine a time of arrival of each of the one or more ranging signals from the one or more sending neighbor vehicles and associate each time of arrival with the sending neighbor vehicle's ranging information using the received radio information.

In general, in another aspect, a vehicle comprises user equipment including memory circuitry and processor circuitry. The memory circuitry and processor circuitry are configured to initiate a ranging process at a first vehicle and generate a vehicle information message including ranging information for the first vehicle and radio information for the first vehicle, wherein ranging information comprises at least a vehicle identifier of the first vehicle and wherein the radio information comprises at least an indication of ranging signal transmission resources and an indication of a particular ranging signal bit sequence. The memory circuitry and processor circuitry are further configured to initiate transmission of the vehicle information message during a first time interval and receive vehicle information messages from one or more sending neighbor vehicles during the first time interval, the vehicle information messages including ranging information and radio information for the sending neighbor vehicle. The memory circuitry and processor circuitry are further configured to initiate transmission of a wideband ranging signal according to the radio information for the first vehicle during a second time interval and receive ranging signals from the one or more sending neighbor vehicles during the second time interval, the received ranging signals comprising the particular ranging signal bit sequence for the sending neighbor vehicle sent on the ranging signal transmission resources for the sending neighbor vehicle. The memory circuitry and processor circuitry are further configured to determine a time of arrival of each of the one or more ranging signals from the one or more sending neighbor vehicles and associate each time of arrival with the sending neighbor vehicle's ranging information using the received radio information. The vehicle further comprises one or more antennas, the one or more antennas mounted and configured to receive the ranging signals from the one or more sending neighbor vehicles and to transmit the wideband ranging signal, wherein one or more of the antennas are designated as receive antennas and one or more of the antennas are designated as transmit antennas.

In general, in another aspect, a user equipment comprises memory circuitry and processor circuitry, the memory circuitry and processor circuitry configured to receive radio assignments from an access point, the radio assignments including transmission time resources and transmission sequences for one or more ranging signals to be transmitted from one or more transmitting antennas of a first vehicle. The memory circuitry and processor circuitry are further configured to initiate transmission of a wideband ranging signal using the transmission time resources and transmission sequences during a ranging signal time interval and receive ranging signals from one or more sending neighbor devices during the ranging signal time interval, the one or more sending neighbor devices using different transmission resources and different sequences than the first vehicle. The memory circuitry and processor circuitry are further configured to determine times of arrival, transmission resources and sequence information of the received ranging signals and generate one or more time of arrival messages to transmit to the access point, the time of arrival messages including the received times of arrival and associated transmission resources and sequence information.

In general, in another aspect, a vehicle comprises a user equipment, the user equipment comprising memory circuitry and processor circuitry. The memory circuitry and processor circuitry are configured to receive radio assignments from an access point, the radio assignments including transmission time resources and transmission sequences for one or more ranging signals to be transmitted from one or more transmitting antennas of a first vehicle. The memory circuitry and processor circuitry are further configured to initiate transmission of a wideband ranging signal using the transmission time resources and transmission sequences during a ranging signal time interval and receive ranging signals from one or more sending neighbor devices during the ranging signal time interval, the one or more sending neighbor devices using different transmission resources and different sequences than the first vehicle. The memory circuitry and processor circuitry are further configured to determine times of arrival, transmission resources and sequence information of the received ranging signals and generate one or more time of arrival messages to transmit to the access point, the time of arrival messages including the received times of arrival and associated transmission resources and sequence information. The vehicle further comprises one or more antennas, the one or more antennas mounted and configured to receive the ranging signals from the one or more sending neighbor devices and to transmit the wideband ranging signal, wherein one or more of the antennas are designated as receive antennas and one or more of the antennas are designated as transmit antennas.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

FIG. 3 shows a multi-phase technique for vehicle ranging and positioning;

FIG. 9 shows stored information and time of arrival reports according to one example;

FIG. 10 shows stored information and time of arrival reports according to another example;

DETAILED DESCRIPTION

Figure 1:
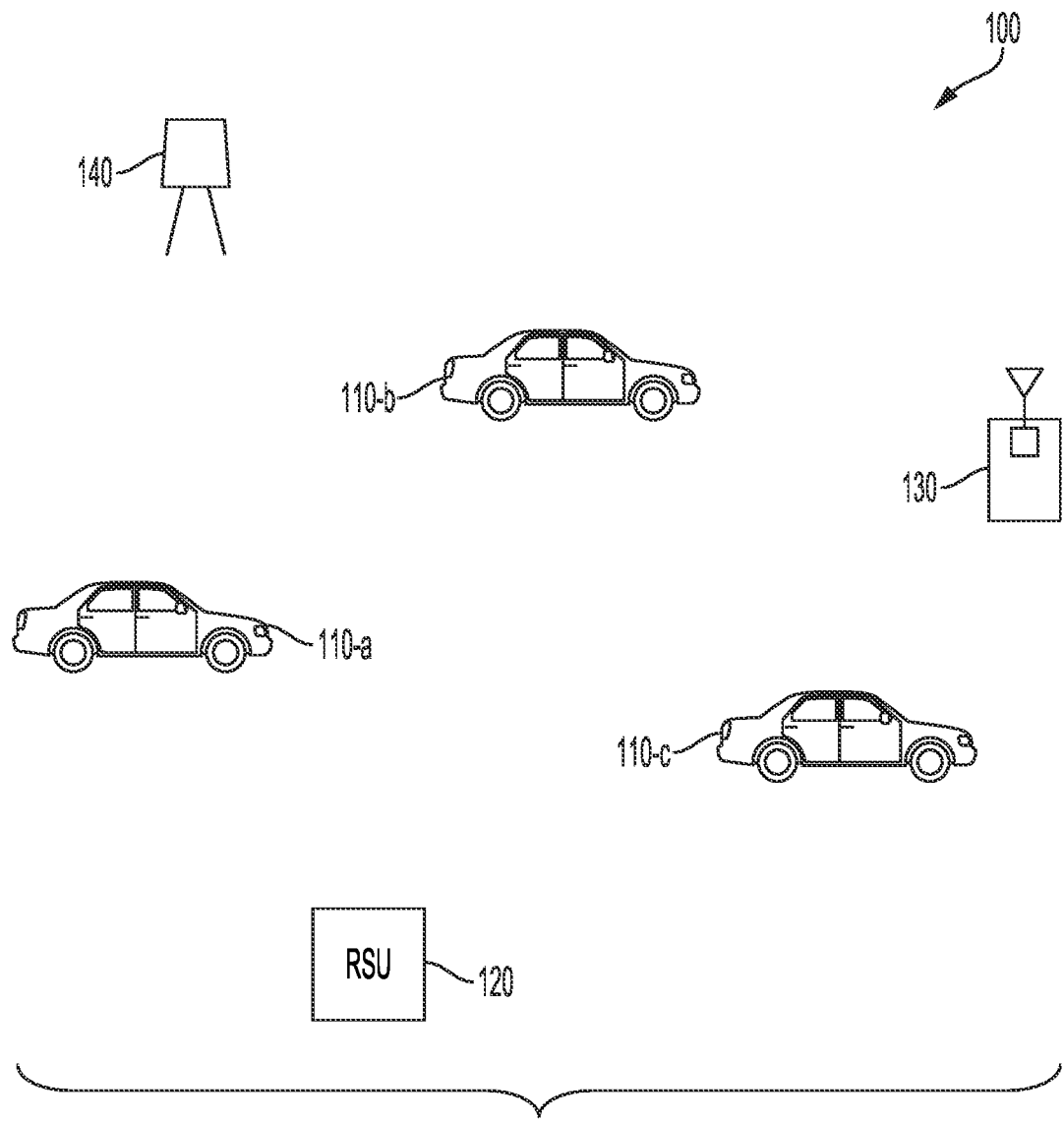
FIG. 1 shows an example system for vehicle positioning and ranging.

Autonomous driving has the potential to revolutionize transportation by reducing negative outcomes caused by factors like the inherent perception and performance limitations of humans. However, safe autonomous driving presents a number of challenges, including a need for accurate position and range measurements.

The term "positioning" refers to determining the location of a vehicle with respect to a fixed coordinate system; for example, in terms of a standard geographical coordinate system referenced to the surface of the Earth. In a standard geographical coordinate system, horizontal coordinates are given in terms of latitude and longitude and vertical coordinates (when used) referred to as elevation or altitude.

Range measurements refer to measurements that indicate the distance between one object and another. In autonomous driving applications, range measurements are used to determine an indication of the distance between one vehicle and another, between a vehicle and a pedestrian, or between a vehicle and other fixed or moving objects. In some applications, range measurements may be used by themselves (e.g., to determine a distance between the vehicle and another object or to determine that the distance is less than one or more thresholds, as a trigger for collision avoidance), while in some applications they are used as part of a positioning technique. For example, a vehicle may use satellite positioning system (SPS) techniques to determine its location, and use range measurements to refine the SPS location.

A vehicle's position may be indicated using its geographic coordinates, or by other parameters that indicate position, such as a set of satellite pseudoranges used to determine position at a device (in a user-equipment or UE-based positioning process) or sent to the network for the network's use in determining position (in a UE-assisted positioning process). Similarly, a range can be indicated by a distance (with reference to a particular unit of measurement) or with reference to a parameter that indicates distance such the time for a signal to travel from one vehicle to the other. For example, the time between transmission at one vehicle and reception at another vehicle, or half of the round trip time (RTT) are parameters that indicate the range between the two vehicles.

Some standards bodies have determined requirements for autonomous driving, including the organization named "3rd Generation Partnership Project" (3GPP), an important source of telecommunication standards. For example, 3GPP Release 16 requirements (from Technical Specification TS 22.186) require support for lateral position accuracy of 0.1 meters between UEs (User Equipments). The standard requires support for relative longitudinal position accuracy of less than 0.5 meters to support platooning applications.

Techniques described herein provide for high accuracy ranging to support autonomous vehicle positioning requirements. The techniques use V2V/V2X messaging, as well as ranging signal transmission and reception. In some implementations, the ranging signals are wide bandwidth signals in order to provide increased location precision; for example, bandwidths of up to 100 MHz or more. In some implementations, the bandwidth is a single block (for example a block of 100 MHz), while in others, the ranging signal bandwidth includes segments of smaller bandwidth portions to make up the total bandwidth (e.g., combinations of multiple 9 MHz channels). In another possible implementation, a maximum bandwidth can be configured by the network for a particular region, so that all vehicles operate within the known maximum.

Vehicles and other devices such as Roadside Units (RSUs) and cell phones that participate in ranging and positioning techniques can transmit and receive a number of parameters and signals as part of Vehicle-to-Vehicle (V2V) and V2X communications. Herein, the term "vehicle" is used to refer to the vehicle as a whole (including user equipment or UE functionality), "RSU" is used to refer to the RSU as a whole, while the phrase "user equipment" or UE refers to the communication device included in the vehicle or RSU that performs V2V/V2X communications, as well as other devices that may perform communication functions described herein such as cell phones.

Some V2V/V2X information is already communicated according to existing or planned techniques and standards. For example, according to 3GPP Release 14, configuration messaging provides the current time and ranging resources, such as the bandwidth for the Phase 2 ranging signals described below. Additionally, some information is included in Basic Safety Messaging (BSM) and Cooperative Awareness Messaging (CAM).

Two ranging modes are described herein. A distributed mode provides techniques that can be used for vehicles without the need for network management of ranging and positioning, which allows for operation out of network coverage. A centralized mode provides at least some network control for presumed efficiencies in resource allocation. A centralized mode leverages infrastructure to ease computational burden on the vehicles, and allows for aggregation of location data from many vehicles—resulting in better location accuracy for each of them.

A vehicle can switch between distributed and centralized modes, or may use one and not the other. For a system in which the vehicle can use either distributed or centralized ranging techniques, it may use distributed techniques in a rural environment and centralized techniques in environments with a higher vehicle and object density. In another example, in an urban setting a vehicle may use a distributed technique with a first repetition rate as well as a centralized technique with a second lower repetition rate. Intervals of about a second may be used between consecutive ranging measurements, and in an example mixed technique a vehicle may use a distributed ranging process about once per second and a centralized ranging process at longer intervals (e.g., between five and twenty seconds) to obtain a more accurate range value.

Distributed and centralized ranging share some common features. For example, vehicles are configured with the current time and the ranging resources (channels to be used for ranging). A vehicle transmits its position (or information indicative of its position, which can include satellite positioning pseudoranges from which position can be calculated), and can communicate the location of each of its antennas with respect to a reference point of the vehicle. Each vehicle transmits wideband ranging signals, receives wideband ranging signals from other vehicles, and subsequently transmits the times of arrival (ToAs) of received ranging signals from other (heard) vehicle(s), along with identifying information. Different techniques can be used for the different messages and signals, as explained in detail below.

In a distributed ranging technique, one challenge is for each vehicle to associate received ranging signals with the particular vehicles that transmitted the ranging signals. In order to enable this association, a vehicle transmits ranging information and radio information during one time interval that allows other vehicles to tie the vehicle's ranging signal transmitted during a different time interval to its identity, and subsequently tie associated ToAs to the correct transmitting vehicle. Ranges between sending and receiving vehicles (and optionally other devices) can be determined based on the ToAs, and the ranges can be used in a position determination process.

The ranging information includes at least a vehicle identifier and one or more antenna identifiers. The vehicle identifier and antenna identifiers enable association of wide bandwidth ranging signals transmitted from the vehicle and received by other vehicles (or other devices) with the sending vehicle. The ranging information can also include other vehicle parameters, such as the current position of the vehicle, current speed of the vehicle, orientation of the vehicle, position of the vehicle antennas with respect to a reference point, and dimensions of the vehicle. The radio information is information related to the radio communications used in the ranging process, and in implementations described herein includes at least an identification of ranging signal sequences to be used to by each transmitting antenna, and the channel resources used for ranging signal transmission. As part of a distributed or centralized ranging process, the vehicle also transmits indicators of ranging measurements such as measured ToAs of signals from heard vehicles or other ranging signal transmitters.

In addition to the information transmitted in messages, vehicles transmit ranging signals that can be received and processed by other vehicles, RSUs, or other devices. As noted above, the ranging signals may be broadband signals with bandwidths up to about 100 MHz. Example implementations of ranging signals are discussed in U.S. pending patent application Ser. No. 15/668,941, which is incorporated by reference herein.

FIG. 1 shows a system 100 for vehicle ranging/positioning. For the illustrated configuration, first vehicle 110-a (which can be referred to as the "ego vehicle," a term that refers to a particular vehicle that is the subject of ranging to other vehicles and objects) can receive and process signals from two other neighbor vehicles: vehicle 110-b and vehicle 110-c, as well as an RSU 120 and a cell phone 130. Vehicles 110-a, 110-b, 110-c and RSU 120 can communicate with network infrastructure using access point 140 (which can be a cellular base station such as an eNB or gNB, or other network apparatus). In a centralized ranging/positioning technique, the network provides at least some control and communication for the ranging/positioning process, while in a distributed ranging/positioning technique, control and communication can be managed without network participation. The techniques are discussed below in reference to vehicles for simplicity, but RSUs and other devices such as cell phones can be incorporated as well.

Figure 2A:
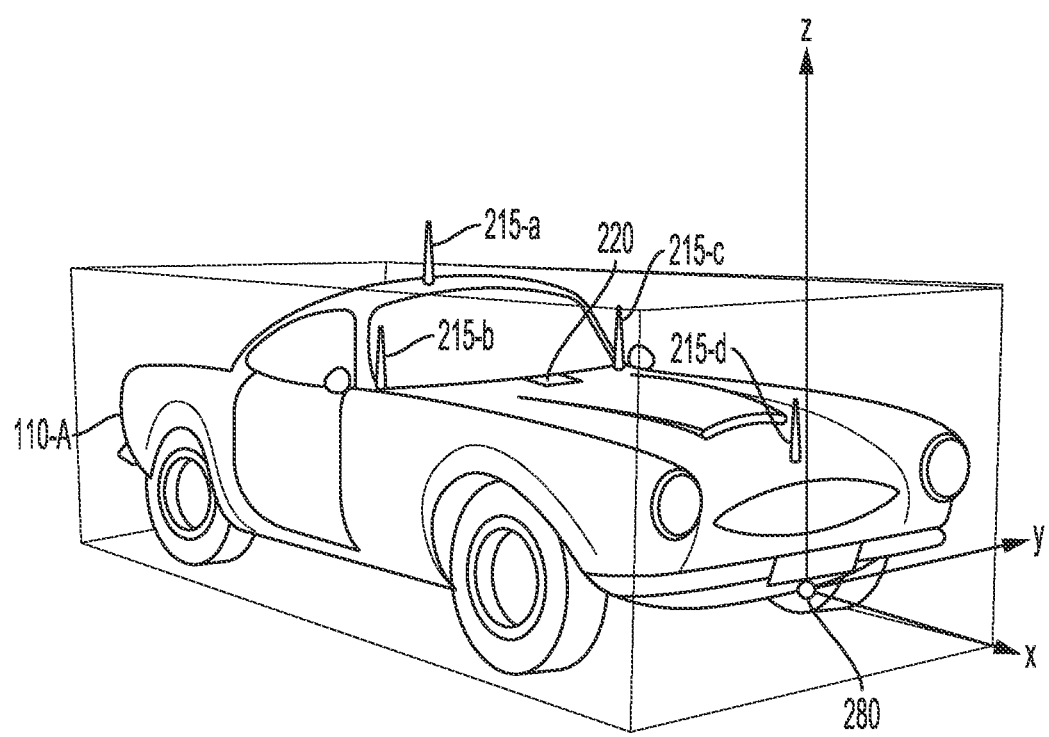
FIG. 2A shows an example of a vehicle to implement disclosed ranging and positioning techniques.

FIG. 2A shows an example representation of a vehicle such as vehicle 110-a. Vehicle 110-a has four antennas 215-a to 215-d mounted and configured to transmit and/or receive signals from other entities. Vehicle 110-a incorporates a UE 220 to communicate with other vehicles and devices using antennas 215-a to 215-d. In some implementations, UE 220 is integrated with the vehicle systems, while in others UE 220 may be a separate device such as a cell phone or standalone navigational device performing the functions described herein. Vehicle 110-a can use all antennas for both receiving and transmitting, or use different numbers of the available antennas for transmitting than it uses for receiving signals. In use, antennas 215-a to 215-d have known positions with respect to a reference position 280 of vehicle 110-a.

Figure 2B:
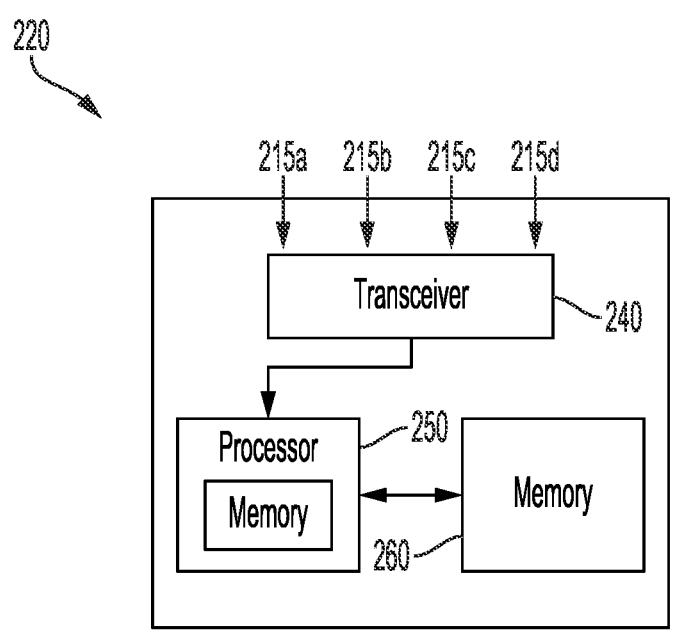
FIG. 2B shows an example of user equipment portion of a vehicle to implement disclosed ranging and positioning techniques.

FIG. 2B shows an example configuration of UE 220 of FIG. 2A. UE 220 includes transceiver circuitry 240 configured to send and/or receive signals using antennas 215-a to 215-d when mounted in vehicle 110-a (using wired/wireless connection). The transceiver circuitry may include the RF components to process incoming signals and outgoing signals to/from antennas 215-a to 215-d (filters, amplifiers, etc.). In some implementations, transceiver circuitry 240 may be implemented with separate receive and transmit circuitry, and may have different receive chains for each antenna, while in others circuitry may be shared. Similarly, receive and transmit chains may be separate or may share one or more components.

In some implementations, some or all of transceiver circuitry is included with antennas 215-a to 215-d. Transceiver circuitry 240 (or transceiver circuitry integrated with the antennas) is in communication with processor circuitry 250 and memory circuitry 260, which includes circuitry to implement a modem, as well as circuitry to access memory circuitry 260 and execute instructions to perform functions described herein. Processor circuitry 250 may be implemented in a single chip (such as a system on a chip), or may be implemented in more than one chip. Similarly, memory circuitry 260 may be implemented in one or more than one memory circuits, and may be at least partially included in processor circuitry 250. UE 220 may include one or more integrated antennas (not shown), and in some embodiments the integrated antennas may transmit and/or receive some messaging, while antennas 215-a to 215-d send and receive ranging signals. In other embodiments antennas 215-a to 215-d transmit and send ranging signals and messages. UE 220 is configured to perform functions discussed below for distributed and/or centralized ranging. For example, memory circuitry 260 and processor circuitry 250 can be configured to initiate a ranging process at a vehicle such as vehicle 110-a, generate and initiate transmission of a vehicle information message with ranging information and radio information for ranging signal transmissions from vehicle 110-a, receive vehicle information messages from other vehicles and/or devices, initiate transmission and reception of ranging signals according to the radio information, determine times of arrival, and associate determined times of arrival with a sender's ranging information using the radio information. UE 220 is configured so that, in operation UE 220 is configured to perform the other functions outlined below. In operation, UE 220 can be mounted on or integrated with a vehicle or other device, and transmit and receive signals using one or more antennas such as antennas 215-a to 215-d.

As noted above, a distributed ranging technique can be implemented without the need for network control or management. FIG. 3 shows a representation of an example multi-phase technique 300 for distributed ranging that can be used, for example, in response to initiation of a ranging process. For example, technique 300 may be used in response to initiation of a positioning application to determine position and/or ranges for autonomous driving.

During a first time interval 310, referred to as Phase 1, a vehicle information message that includes at least ranging information and radio information for the vehicle is generated and transmitted from participating vehicles such as vehicle 110-a (the ego vehicle for purposes of this description). During Phase 1, broadcast messages are also received from neighbor vehicles and include their ranging information and radio information. Vehicle 110-a transmits a Phase 1 vehicle information message so that other vehicles can associate its identity with a ranging signal (transmitted by vehicle 110-a during a different time interval), and subsequently with the Time of Arrival (ToA) for that ranging signal.

The Phase 1 vehicle information message may be a MAC message, RRC message, or may be an upper layer message. As noted above, ranging information refers to vehicle parameters and includes at least a vehicle identifier, such as a RangingID parameter or Layer 2 ID (L2ID). The ranging information transmitted in Phase 1 may also include antenna identifiers (such as the AntennaID parameters described herein) for antennas that will be transmitting ranging signals in Phase 2 described below. In some embodiments, a RangingInfo parameter that identifies both the sending vehicle and the transmitting antenna can be used. Additional ranging information, such as the location of the antennas with respect to a reference point on the vehicle, dimensions of the vehicle, or other vehicle parameters may also be included in the Phase 1 messages or other messaging.

Radio information refers to signal transmission information. The radio information transmitted as part of the Phase 1 vehicle information indicates the resources that will be used by a particular transmission antenna for Phase 2 ranging signal transmissions, as well as the bit sequence that the antenna will be using. The ranging signal transmission resource may be indicated by a transmission resource index parameter ResrcIndx and bit sequences may be identified by sequence identification parameters SeqIDs, such as Zadoff-Chu (ZC) SeqIDs for ZC bit sequences. Radio information can also include the ranging bandwidth if not otherwise provided.

During a second time interval 320, referred to as Phase 2, ranging signals are transmitted from participating vehicles according to the radio information from Phase 1 and received at other vehicles, which are also transmitting ranging signals during time slots in Phase 2. Time of Arrival (ToA) information is derived from the ranging signals received during Phase 2.

Time of arrival messages are generated to be transmitted to other vehicles during a third time interval 330, referred to as Phase 3. The time of arrival messages include ToAs of Phase 2 ranging signals received at one or more receive antennas of the vehicle from neighbor vehicles, as well as additional information for receiving vehicles to associate ToAs with vehicle and antenna identities. Phase 3 time of arrival messages may include other information such as information about the vehicle dimensions, satellite positioning information, etc. The Phase 3 time of arrival messages can be upper layer messages generated by sending ToA and other information up from the PHY and MAC layers to an application layer.

Also during Phase 3, the vehicle receives time of arrival messages from neighbor vehicles that contain time of arrival information for its ranging signals received at the neighbor vehicles. Referring again to FIG. 1, in an example where a first vehicle 110-*a* receives Phase 2 ranging signals from a single first neighbor vehicle 110-*b*, during Phase 3 vehicle 110-*a* transmits the ToAs it computed of the received Phase 2 positioning signals from vehicle 110-*b* on one or more of its receiving antennas, associated with vehicle 110-*b*'s ranging information (e.g., as RangingID and transmitting AntennaIDs, or a combined RangingInfo parameter). More detail about different examples of Phase 3 time of arrival messaging is provided below.

The multi-phase process of FIG. 3 repeats at intervals. In the example of FIG. 3, the process occurs every second, so first ranges are determined at a first time from Phase 1 interval 310, Phase 2 interval 320, and Phase 3 interval 330, and second ranges are determined at a second time using another Phase 1 interval 310', phase 2 interval 320' and Phase 3 interval 330'.

Using ToA measurements from received Phase 2 ranging signals transmitted by neighbor vehicles and ToA values communicated in Phase 3 messages received from neighbor vehicles (with the times of arrival of signals transmitted by the vehicle during Phase 2), ranges to the neighbor vehicles and/or the vehicle position can be calculated. The following describes the different phases, signals, and measurements in more detail.

Figure 4:
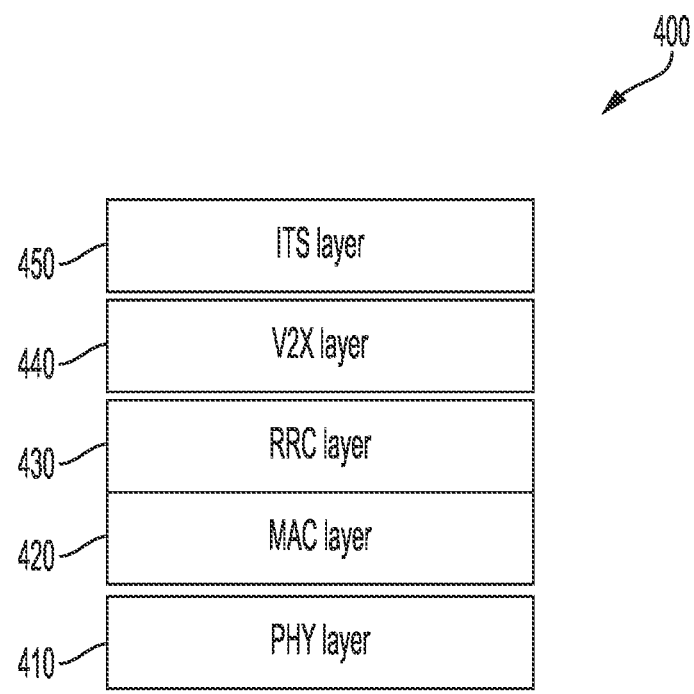
FIG. 4 shows an example hierarchical layer structure for vehicle communications.

The ranging techniques described herein use different layers within the UE for different phases (time intervals). FIG. 4 illustrates a representation 400 of an example hierarchical layer structure for V2X communications, including physical (PHY) layer 410, Media Access Control (MAC) layer 420, Radio Resource Control (RRC) layer 430, Vehicle to Everything (V2X) layer 440 (an example of a V2X layer outlined by the 3GPP Services and Systems Aspects working group, SA2), and the upper Intelligent Transport System (ITS layer) 450 (an example of a V2X messaging upper layer). Some standard 3GPP layers are omitted from FIG. 4 for simplicity, such as an application upper layer.

For vehicle communications, the lower layers can be standard 3GPP layers that may have enhancements for V2V operations, while some upper layers are being defined particularly for vehicle communications. PHY layer 410 manages physical aspects of transmission and reception, while MAC layer 420 that controls flow and multiplexing for the physical layer. A network layer includes Radio Resource Control (RRC) layer 430 that controls the behavior of MAC layer 420. 3GPP has defined V2X layer 440 on top of the Packet Data Convergence Protocol (PDCP) layer (not shown) to manage V2X connections using the lower 3GPP layers. An Intelligent Transport System (ITS) upper layer 450 is defined on top of the V2X layer to manage vehicle messaging. The ITS upper layer 450 is only an example of an upper layer that can be used for ranging applications. Additional upper layers include an application layer (not shown) for managing applications including a position application to determine positions and/or ranges.

Figure 5:
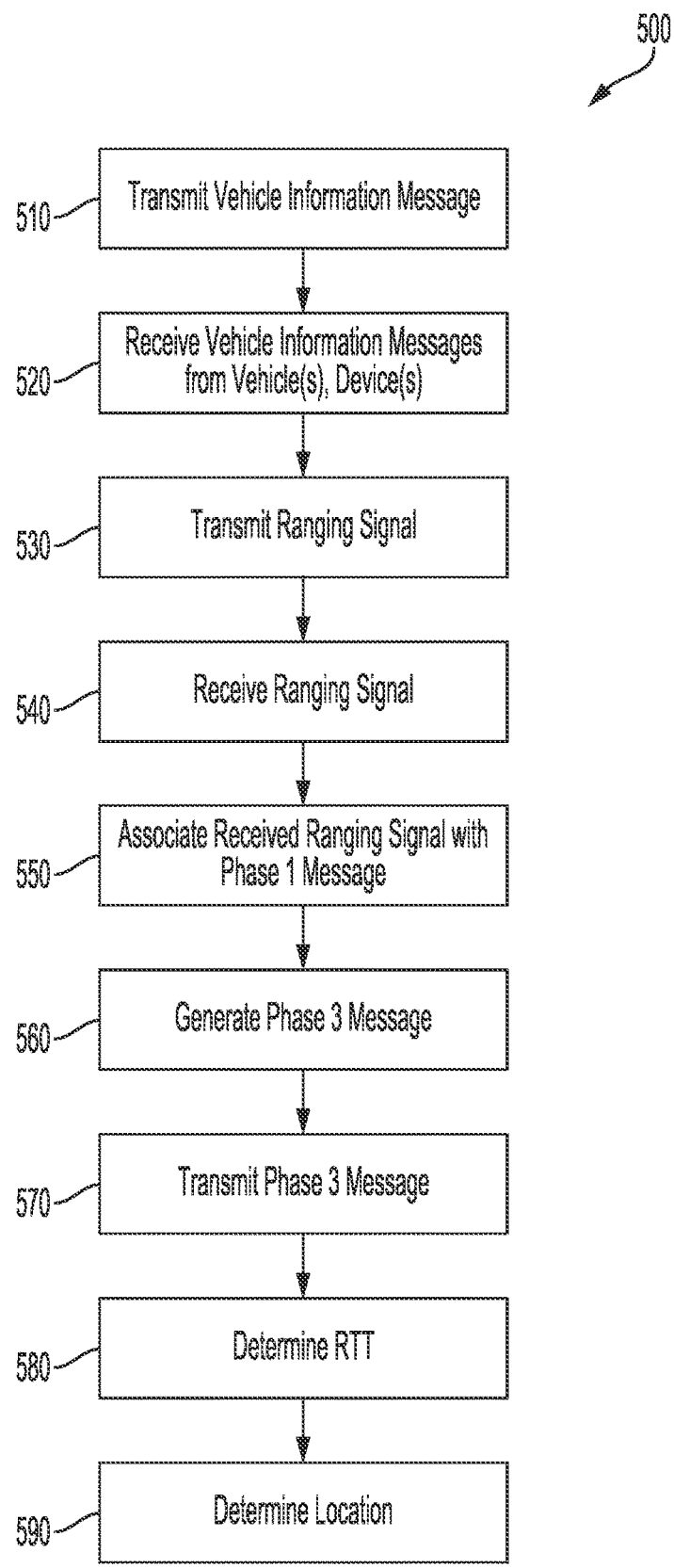
FIG. 5 is a flow diagram for an example distributed ranging technique.

FIG. 5 is an example process 500 to implement a multi-phase distributed ranging/positioning technique for a system such as system 100 of FIG. 1. Process 500 is performed at a first vehicle, such as vehicle 110-*a* of FIG. 1 or 2A, in response to initiation of a ranging process to determine range from one or more neighbor vehicles such as vehicle 110-*b*, vehicle 110-*c* (and optionally RSU 120 or cell phone 130). Note that although only first and second neighbor vehicles are discussed for ease of explanation, the current techniques can be used if there is only a single neighbor vehicle, or if there are three or more. As vehicles travel their different routes, the number and identity of neighbor vehicles changes; for example, if vehicle 110-*b* and 110-*c* are neighbor vehicles at a first time, only vehicle 110-*b* may be a neighbor vehicle at a later time, while an entirely new set of vehicles may be near vehicle 110-*a* within a relatively short time. Since ranging signals in general travel on the order of hundreds of meters, in many situations the number and identity of neighbors can change over a few repetitions of the ranging techniques herein (assuming about one second between consecutive cycles).

At 510, during Phase 1, vehicle 110-*a* initiates a transmission of a vehicle information (Phase 1) message including ranging information and radio information. For example, in response to initiation of a positioning application, vehicle 110-*a* transmits a MAC message, RRC message, or upper layer message with ranging information that includes a sender identifier and antenna identifiers for its transmitting antennas; for example, antennas 215-*a* to 215-*d*. The vehicle information message may also include information indicative of the relative location of antennas 215-*a* to 215-*d* on vehicle 110-*a*, vehicle dimension information, etc., although this information may be transmitted during other messaging (e.g. in a Phase 3 message). The radio information includes transmission resource information and sequence information for antennas 215-*a* to 215-*d* for ranging signals to be transmitted in Phase 2. In some implementations, each vehicle self-selects transmission resources for its antennas, while in some implementations the resources (or a range of available resources) are assigned.

The vehicle identifier may be a 3 byte MAC message source L2ID (Layer 2 identifier), or a different identifier such as a RangingID parameter defined for vehicle ranging. In another example, the sender identifier may be an ID that includes both an indication of the sender and of the sending antenna(s), such as the RangingInfo parameter discussed below, or some other sender identifier. The ranging information can include information indicative of the relative location of antennas 215-*a* to 215-*d* to a reference point of the vehicle. If vehicle 110-*a* does not transmit information indicative of the relative location of antennas 215-*a* to 215-*d* as part of Phase 1 messaging, it can transmit the information at a different time; for example, in Phase 3 or other messaging.

The transmission resource information may be a transmission resource index parameter (RsrcIndx) for the particular antenna, while the sequence information may be a SeqID of a bit sequence such as a Zadoff Chu (ZC) sequence to be used by the particular antenna (during Phase 2 transmission of the ranging signal). Zadoff Chu sequences can provide low cross-correlation among signals from different transmitters, but other sequences may be used. The number of available sequences that may be pre-provisioned or dynamically assigned to transmitting antennas should be large enough to allow identification of Phase 2 ranging signals for the expected density of automobiles transmitting within ranging distance of one another. The transmission resource index may include a subframe number and a symbol number. The resource configuration is technology-specific, but for an example configuration for LTE framing with 16 subframes each with 14 symbols, 4 bits are needed to indicate the subframe and 4 bits are needed to indicate the symbol number.

At 520, also during Phase 1, vehicle 110-*a* receives vehicle information messages with ranging information and radio information from other vehicles, such as vehicle 110-*b* and vehicle 110-*c*, and/or RSUs 120. Based on the received Phase 1 messages, when vehicle 110-*a* receives Phase 2 signals from the other vehicles/devices it can tie them to the sending vehicle using the resources and sequences. Vehicle information messages for other types of devices can have different information. For example, since an RSU is in a fixed and known location, it may send that location and an indication that it is an RSU and/or that it is a fixed device.

Phase 1 vehicle information messages may use a variety of formats. Table 1 shows MAC parameters for a first example of a Phase 1 vehicle information message that is an encoded MAC message, while Table 2 shows MAC parameters for an alternate example of a Phase 1 vehicle information message.

TABLE 1

Example MAC parameters

| Parameter | Description |
| --- | --- |
| RangingID | E.g., self-selected ID, can be a new ID or L2ID |
| Ranging bandwidth | In MHz, a block or an indication of multiple bandwidth portions |
| Sequence of triplets: | |
| TXAntennaID | To link SequenceID and Transmission resource, they all form a triplet |
| Sequence ID | An assigned ID for a particular ZC sequence; one of a number of possible sequences (e.g., 8) |
| TX resource index | Subframe number and a symbol number. |
| TX Antenna location | For ranging use, relative to vehicle reference point position |

TABLE 2

Alternate Example MAC parameters

| Parameter | Description |
| --- | --- |
| Ranging bandwidth/carrier | In MHz, a block or an indication of multiple bandwidth portions |
| Sequence of couplets, where the shaded parameters are Ranginginfo and the unshaded parameters are RadioInfo: | |
| RangingID | E.g., self-selected ID, can be a new ID or L2ID |
| TXAntennaID | To link SequenceID and Transmission resource, they all form a triplet |
| TXAntenna Location | For ranging use, relative to vehicle reference point position |
| Sequence ID | An assigned ID for a particular ZC sequence; one of a number of possible sequences (e.g., 8) |
| TX resource index | Subframe number and a symbol number. |

In implementations where the Phase 1 vehicle information message is a MAC message, it contains the parameters that are used to associate Phase 2 ranging signals with the appropriate Phase 1 information: RangingID, transmission AntennaIDs, transmission resource index RsrcIndx, and ZC SeqIDs. In implementations where the Phase 1 vehicle information message is an upper layer message, it can contain lower layer information according to a number of options. For example, if the upper layer has the vehicle's Ranging ID and Antenna IDs, then the MAC layer needs information designating radio resources for the Phase 2 signal. The MAC layer can use a MAC-CE (control element) add-on containing radio resources for the Phase 2 message, in response to an indication that the message is a ranging message. For example, the PPPP (ProSe per packet priority)

of the upper layer message can indicate ranging, or there may be a more explicit indication such as another new Quality of Service (QoS) parameter, e.g. 5QI/V2X QCI (Quality of Service class identifier), or a specific control parameter associated with the message. In another example, if the upper layer message contains a radio container (opaque to upper layer) that was pushed up by its MAC instead of sending a MAC message, the receiver of this message at the upper layer then pushes the radio container down to its MAC. Then when the Phase 2 message is received, the receiver MAC has all the information of the Phase 1 message from that sender, and can tie the signals it heard on the indicated transmission resources to the correct sender identifier.

At 530, during Phase 2, vehicle 110-a initiates transmission of ranging signals from the one or more transmit antennas identified in its Phase 1 message, according to the ranging information and radio information in the Phase 1 message; that is, using the sequences and resources identified in its Phase 1 message for each transmitting antenna. For example, for each antenna 215-a to 215-d, vehicle 110-a transmits a wideband sequence with the associated ZC sequence ID (SequenceID) on the associated resource index (RsrcIndx). At 540, also during Phase 2, receiving antennas of vehicle 110-a receive ranging signals from the transmitting antennas of other vehicles and RSUs, such as vehicles 110-b and 110-c and/or RSU 120 and cell phone 130, using associated sequences and transmitted during associated resources communicated during Phase 1. In the example of FIG. 5, transmission and reception at vehicle 110-a occur during different time slots in a half duplex technique. If full duplexing is enabled, transmission and reception could occur concurrently.

As noted above, embodiments of Phase 2 ranging signals that can be used are described in pending U.S. patent application Ser. No. 15/668,941, incorporated by reference herein. In an example embodiment, a ranging cycle such as second time interval 320 of FIG. 3 is divided into M ranging sub-cycles, and each vehicle UE can select one symbol in each ranging sub-cycle. The selection can be pseudo-random (with the vehicle identifier or other number used as a seed), so that it is unlikely that two different vehicle UEs choose the same symbol in each sub-cycle. Referring again to FIG. 1, even if neighbor vehicles 110-b and 110-c transmit during the same symbol in one sub-cycle, it's unlikely that they will also use the same symbol in a different sub-cycle. Similarly, for a half duplex configuration, if vehicle 110-a is transmitting during the same symbol neighbor vehicle 110-b is transmitting for a particular sub-cycle, it cannot receive the transmission from vehicle 110-b for that sub-cycle, but it is unlikely that both vehicles will select the same symbol for other sub-cycles.

Time of arrival determination can be performed using lower layer processing, including physical layer processing, media access control layer processing or both. For example, at 550, received Phase 2 signals are associated with received Phase 1 messages. For example, the Phase 2 signals are associated based on PHY layer information. ToA measurements from received Phase 2 ranging signals can be indexed by the transmission resource index and sequence ID corresponding to the received signals, then passed up to the MAC layer to tie this index to the RangingID and AntennaID from the received Phase 1 message that contained the TX resource index and SequenceID. The ToA information and identifier information can be passed to an upper layer for upper layer processing to generate Phase 3 messages.

At 560, Phase 3 messages are generated by associating received ranging information and radio information from neighbor vehicle Phase 1 messages with received Phase 2 signals. For example, a Phase 3 message may contain pairs of (RangingInfo, ToA) (or: RangingID and pairs (ToA, antenna ID)), for each received set of Phase 2 messages that are determined to come from the same RangingID. For distributed ranging, the ToAs for a particular set of transmission resource and sequence ID can be associated with the correct ranging information (RangingID and AntennaID) based on received Phase 1 messages. Alternatively, instead of the RangingInfo or RangingID, the Phase 3 message could just contain the (ToA, SequenceID, ResrcIndx). The receiver of Phase 3 message could derive the RangingInfo or RangingID from Phase 1 message and such information. In addition, the Phase 3 message should also contain the RangingInfo of the vehicle sending the message. This RangingInfo or (Ranging ID and optionally Antenna ID) indicates the vehicle and the corresponding antenna that the list of ToA values are measured. The RangingInfo may also contain the information regarding the antenna position offset regarding the vehicle coordinates. This RangingID for the sending vehicle in Phase 3 message can be sent either as part of the payload of Phase 3 message, or as a header that includes this RangingID (between ITS and MAC headers). If this RangingID is the L2 Source ID, then the Phase 3 message does not need to include it since it is already included in the MAC layer header, as the L2 Source ID of the vehicle that sent the Phase 3 messages.

At 570, during Phase 3, vehicle 110-a initiates a transmission of the Phase 3 upper layer (e.g., ITS layer) message. For example, in Phase 3, vehicle 110-a transmits an upper layer transmission including a RangingID of received Phase 2 ranging signals, a list of Times of Arrival (ToAs) of ranging signals received during Phase 2 (considering location of originating antenna), an indication of vehicle 110-a's location and orientation during Phase 2 (e.g., a location value in longitude/latitude for a UE-based location technique or optionally a different indicator such as pseudoranges to satellites for a UE-assisted location technique), and optionally relative location of antennas 215-a to 215-d. Vehicle 110-a transmits the information for each heard sender in one message or using one message per receiving antenna for all heard senders. If a single message is sent, it may be a sequence of heard ranging information (the sending vehicle's identifier and the sending antenna's identifier), list of ToAs from Phase 2 signals as measured by each of the receive antenna(s), receive AntennaID, and relative antenna locations. If one message is sent per receiving antenna for all senders, the Phase 3 message includes the receiving AntennaID, then a sequence of heard ranging information, list of ToAs from its Phase 2 signals as measured by the particular receive antenna.

At 580, vehicle 110-a uses the received ToA information indicating receipt of its Phase 2 signals at other vehicles, as well as ToAs determined in Phase 2 based on receipt of Phase 2 signals from the other vehicles to compute the Round Trip Time (RTT) to other heard vehicles, which is an indication of the range between vehicle 110-a and the other vehicle. At 590, vehicle 110-a can use the range information to compute its own location during Phase 2. Techniques to determine or refine position based on range information are known; for example, using the known position of multiple transmitters and the range to those transmitters, and/or using range information to refine existing position information (such as a satellite position) using Kalman filtering or other techniques. Vehicle 110-a can obtain the location of neighbor vehicles 110-b and 110-c in a number of ways; for example, it can be obtained from the Basic Safety Messaging (BSM), and/or it may be included in range messaging as part of a Phase 3 message or other message.

Thus, in process 500 of FIG. 5, in Phase 1, vehicle 110-a transmits information that other vehicles or RSUs can use to receive its ranging signals and associate the received ranging signals with vehicle 110-a and its antennas 215-a to 215-d. During Phase 1, vehicle 110-a also receives similar information from other vehicles and/or RSUs so it will know which ranging signals to associate with a vehicle and transmitting antenna (based on the ZC sequence and resources). In Phase 2, vehicle 110-a transmits signals with the ZC sequences and on the transmit resources it communicated during Phase 1. In Phase 3, vehicle 110-a transmits time of arrival information formatted so that other UEs can compute a range to vehicle 110-a, and receives information from other vehicles and/or RSUs to use in computing ranges.

Figure 6:
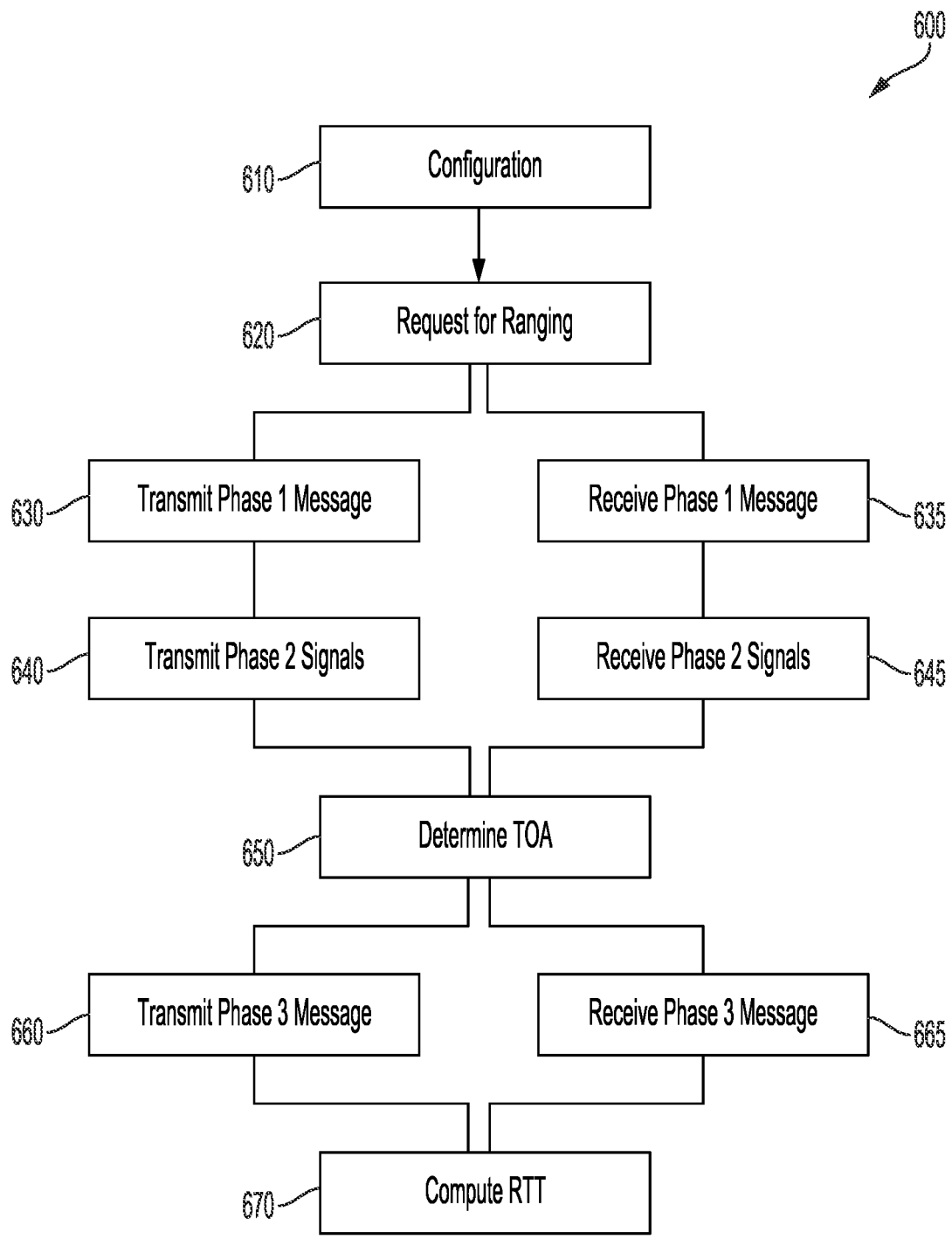
FIG. 6. Shows a flow diagram for another example distributed ranging technique.

FIG. 6 shows a more detailed example process 600 with inter-layer triggering of different phases for a vehicle such as vehicle 110-a of FIGS. 1 and 2A. In the example of FIG. 6, Phase 1 vehicle information messaging is implemented in the MAC layer. Process 600 can be used for autonomous (or semi-autonomous) driving, to increase the accuracy of vehicle position measurements.

At 610, configuration for ranging signaling (such as bandwidth for Phase 2 ranging signals) comes from a Non-Access Stratum (NAS) layer to the modem (RRC), or is modem-selected. At 620, in response to initiation of a positioning application, a request is sent to the modem to start the ranging procedure, and transmission antenna IDs are provided.

At 630, on the transmit side, RRC triggers a Phase 1 MAC message to be sent using the antennas 215-a to 215-d. RRC provides the ranging bandwidth (part of configuration) to the PHY layer, along with a RangingID (which may be self-selected), along with the series of self-selected triplets (ZC sequence ID, resource index, and the transmission AntennaID for this ranging signal). At 835, on the receive side, PHY receives Phase 1 messages from other vehicles and/or RSUs using receive antennas (e.g., antennas 215-a and 215-d for an implementation where fewer antennas are used to receive than to transmit). The messages are passed up to RRC or other upper layer, in an appropriate format; for example, as a RangingID associated with a triplet including transmission AntennaID, ZC SequenceID, and Resource Index RsrcIndx.

At 640, on the transmit side, PHY sends Phase 2 signals based on (self-selected) resources and configuration; e.g., which radio frame is used for ranging. At 645, on the receive side, PHY receives Phase 2 messages from other vehicles and/or RSUs based on prior reception of information from Phase 1 messages and configuration.

At 650, PHY measures ToAs for all Phase 2 messages and RRC sends PHY-measured ToAs from senders heard during Phase 2 to RRC or other upper layer using a report ID that identifies reports over time. The report ID should allow the upper layer to link this report to the appropriate RangingID and/or AntennaID of one of the Phase 1 messages it received and stored.

At 660, on the transmit side, an upper layer constructs a Phase 3 message and sends that message to PHY and transmits the Phase 3 message with a certain PPPP/Quality of Service class identifier (QCI) within a suitable time boundary and corresponding report ID it previously received from the lower layer. At 665, on the receive side, PHY receives Phase 3 messages from other vehicles/RSUs, and passes them to the positioning application.

At 670, the positioning application accesses ToAs calculated from received Phase 2 signals (times of arrival for ranging signals from other vehicles/RSUs), and ToAs of its ranging signals received at other vehicles/RSUs from Phase 3 messages from those vehicles/RSUs and computes RTT to each vehicle/RSU. From the RTTs, vehicle 110-a can determine ranges, and determine/refine its own position.

Figure 7A:
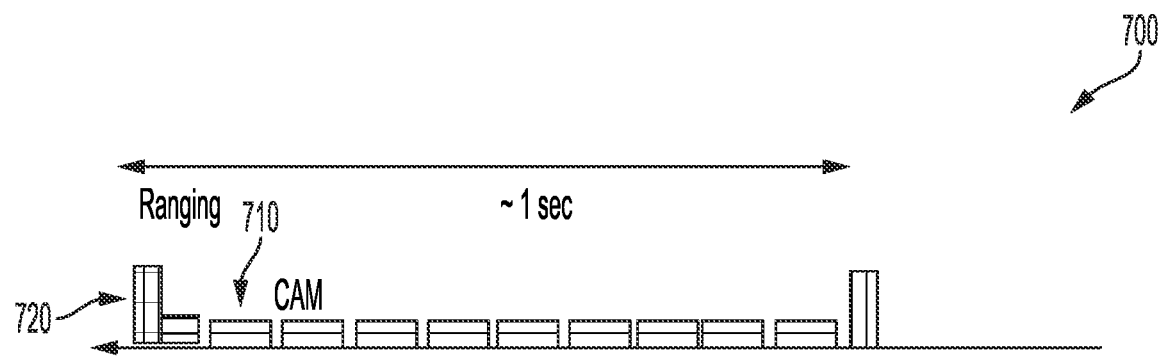
FIG. 7A shows relative timing for ranging and CAM communications.
Figure 7B:
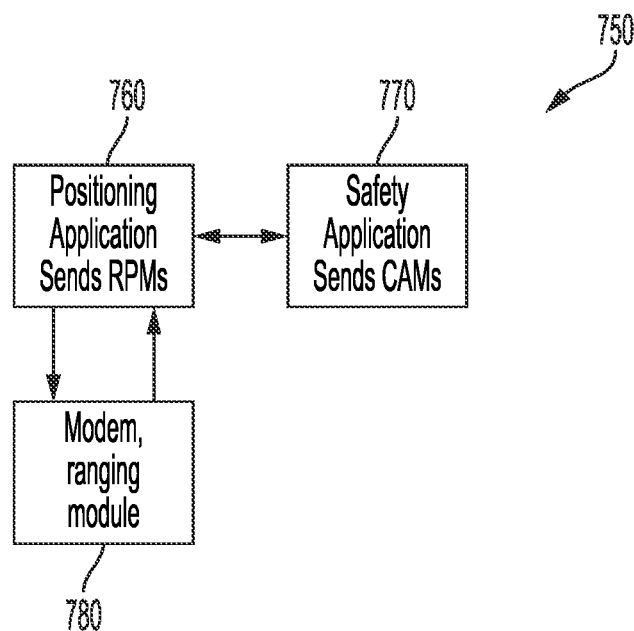
FIG. 7B shows the interactions among a positioning application, safety application, and modem ranging module.

In some implementations, existing messaging can be used for some aspects of positioning described herein. FIG. 7A shows the timing 700 for ranging and Cooperative Awareness Messaging (CAM) signaling, in some implementations. FIG. 7B shows an example diagram 750 of the interaction of a positioning application 760, safety application 770, and the modem and ranging module 780.

CAM and Basic Safety Messaging (BSM) are already established in autonomous driving. CAM messages, sent by neighbor vehicles with ranging signals, can provide vehicle information such as vehicle size and speed. These parameters may be helpful in estimating the vehicle's position.

Referring to FIG. 7A, the current periodicity of CAMs 710 is ten times the suggested periodicity of ranging periods 720, but the exact starting times do not necessarily align. Referring to FIG. 7B, positioning application 760 accesses a Phase 3 message sent by a neighbor vehicle as part of the multi-phase ranging signaling described above. The Phase 3 message includes the sending vehicle's RangingID and has a timestamp indicating its transmission time. The positioning application 760 determines the Source L2 ID from the Phase 3 message (which may be the same as RangingID or may be different). Once the positioning application 760 has the Source L2ID, it accesses one of the CAMs that was received (and assumed stored) from the particular source L2ID at the safety application 770. Vehicle information such as a vehicle size indication included in the CAMs is static, so it can be accessed and used for ranging and positioning. Dynamic CAM information such as vehicle speed can be accessed and used as well, but it should be from the CAM closest in time to the sent Phase 2 signals.

Modem 780 can send pairs of the BSM/CAM and Phase 3 messages that come from the same source L2ID. Modem 780 can get CAM from safety application 770, then link it to the RangingID to be used by positioning application 760. If dynamic information is required from the CAMs, then the CAM requested by the positioning application 760 from the safety application 770 should be the one that was sent closest (in time) to the sent Phase 2 signals. Once the positioning application has generated range and/or position information, safety application 770 can use the output of the positioning application 760.

Figure 8:
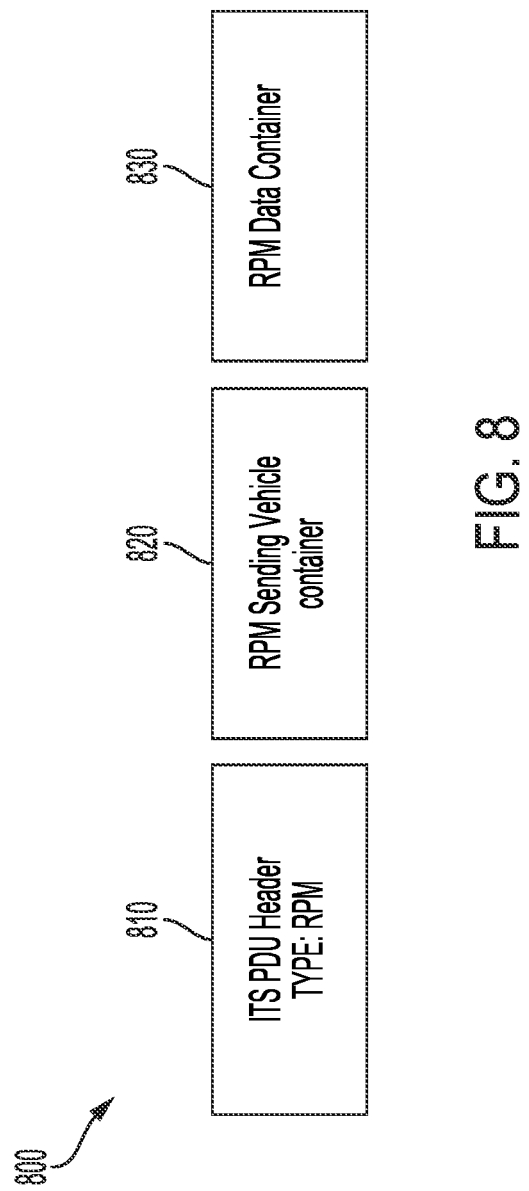
FIG. 8 shows a Ranging Proto Message (RPM) message format.

Some existing protocols and data elements can also be used for Phase 3 ranging messages. FIG. 8 shows a diagram 800 of a new message type, referred to as a Ranging Proto Message (RPM). The RPM uses some ITS protocol and data elements from ETSI-ITS (102.894-2) for Phase 3 ranging messages. Format and encoding for some data elements is re-used; e.g., for vehicle position, timestamp, and antenna information data elements. New data elements may be added as needed. In some implementations, the security header/trailer included in other ITS message types may be omitted.

An ITS PDU header 810 identifies the message as having an RPM message type. RPM sending vehicle container 820 includes the vehicle's RangingInfo, the vehicle's location and orientation during Phase 2, and the vehicle's receive antenna information. RPM data container 830 includes the Phase 3 information; for example, a sequence of (RangingInfo, List of ToAs from its Phase 2 ranging signals).

Data elements for a sending vehicle container 820 may include elements from the Originating Vehicle Container ETSI ITS "Collective perception" message. The RangingInfo data element can be a RangingID, or RangingID plus AntennaID. If the RangingID is not the MAC message Source L2ID, a ranging identifier data element is required for the RPM. A data element indicating location during Phase 2 includes one or more of: latitude, longitude, PositionConfidenceEllipse (indicating a confidence in the given latitude and longitude), and altitude. An orientation data element includes heading, elevation, and banking. A heading element indicates azimuth angle. Elevation angle and banking angle data elements are also included. Examples of the sending vehicle container data elements are shown in Table 3.

TABLE 3

Example sending vehicle container data elements

| Data Element | TS 102-894-2 Common Data Dictionary reference |
|---|---|
| Generation Delta Time | See CAM ETSI EN 302 637-2. generationDeltaTime = TimestampIts mod 65 536. TimestampIts represents an integer value in milliseconds since 2004-01-01T00:00:00:000Z. In one ms steps INTEGER (0 . . . 065535) |
| Ranginginfo | Ranging ID (single) or Ranging ID plus antenna ID (multiple) |
| Location during Phase 2 | A.124: latitude, longitude, positionConfidenceEllipse, altitude. Geographical position of an ITS-S. In a WGS84 coordinate system, providing a range of 90 degrees in north or in south hemisphere." unit 0.1 microdegree. Altitude may not be available. |
| Orientation | Contains Heading, Elevation, and Banking |
| Heading | A.112 Heading in a WGS84 co-ordinates system. Orientation of a heading w.r.t. the WGS84 north. HeadingValue ::= INTEGER {wgs84North(0), wgs84East(900), wgs84South(1800), wgs84West(2700), unavailable(3601)} (0 . . . 3601) 0.1 microdegree |
| Elevation Angle | ElevationValue := INTEGER (0. . . . 9001) Unit 0.1 microdegree + Confidence? |
| Banking Angle | BankingValue := INTEGER (0 . . . 9001) Unit 0.1 microdegree + Confidence? |

An antenna sub-container of vehicle container 820 may contain additional data elements. For example, a RXAntennaID is a unique ID for an antenna that can be generated when the UE starts. Antenna position data elements can be derived from an ETSI reference position from Clause B.19 in EN 302-637-2 (defined for sensors), and given with respect to the ground position of the center of the front side of the bounding box of the vehicle. Antenna position has three coordinates, the x position, which is the mounting position of the antenna in a negative x direction according to ISO 8855 reference frame, measurement from the ETSI reference position. This is always positive since the reference position is at the front of the car. The y position is the mounting position of the antenna in the y direction according to the ISO 8855 reference frame, measured from the ETSI reference position. The z position is the mounting position of the sensor in the z direction according to the ISO 8855 reference measured from the ETSI reference position, with the addition of the height of the antenna from the same center. The ISO 8855 is just an example of a standardized reference frame; other reference frame configurations can be used. Alternate expressions of the data elements can be used; for example, rather than three separate data elements, antenna position could be a data element with three fields: x, y, and z positions. Examples of the sending vehicle container antenna subcontainer data elements are shown in Table 4.

The RPM sending vehicle container can include a vehicle length, vehicle width, and vehicle height. Instead of (or in addition to) including these data elements in the RPM sending vehicle, they can be obtained from CAMs/BSMs (along with vehicle speed). Speed and acceleration are not strictly required, but may be helpful. For example, if a vehicle's UE measures the GPS position at a particular measurement time that does not coincide with the beginning of Phase 2, then the UE does not know the GPS position at that time. In this case velocity and acceleration information are helpful to extrapolate the GPS position at the beginning of Phase 2. However, the UE can alternatively extrapolate the GPS position locally and only transmit the extrapolated GPS position. In that case velocity/acceleration do not need to be transmitted. CAM data elements may include any or all of the longitudinal speed, lateral speed, vertical speed, longitudinal acceleration, and lateral acceleration. Table 5 includes some example data elements related to the vehicle, and Table 6 includes example CAM information that can be used in a ranging technique.

TABLE 4

Example sending vehicle container antenna subcontainer

| Data Element | SI Unit | Description |
|---|---|---|
| RXAntennaID | — | Unique ID of antenna ID, can be a random number generated when UE starts |
| Antenna Position | | (ETSI Reference position from Clause B.19 in EN 302 637-2) w.r.t. the vehicle "Ref pos" - e.g. ground position of the center of the front side of the bounding box of the vehicle. |
| Position X | meters or .1 m | Mounting position of the antenna in negative x-direction according to the ISO 8855 [i.15] reference frame, measured from the ETSI reference position |
| Position Y | m or .1 m | Mounting position of the sensor in y-direction according to the ISO 8855 [i.15] reference frame, measured from the ETSI reference position. Max may be on the order of two meters |
| Position Z | m or .1 m | Mounting position of the sensor in z-direction according to the ISO 8855 [i.15] reference frame, measured from the ETSI reference position. Max may be on the order of four meters |

TABLE 5

Example vehicle size sending vehicle container data elements

| Data element | TS 102 894-2 Common Data Dictionary reference |
|---|---|
| Vehicle length | A.131: lengthValue (A.92, 10 bits) lengthConfidence(A.91, ~3 bits). Unit 0.1 m |
| Vehicle width | A.95 vehicleWidth. (incl. side mirrors) Unit 0.1 m |
| Vehicle height | vehicleHeight. Unit 0.1 m. Max may be about 6 m |

TABLE 6

Example CAM information

| Data Element | Description |
|---|---|
| Longitudinal speed | A.126 speedValue (m/s), speedConfidence. INTEGER (0 . . . 16383). Unit 0.01 m/s. (Max ~163 m/s) -> 14 bits, speedConfidence see (A.72), 7 bits |
| Lateral Speed | A.126 (as above) |
| Vertical Speed | New vertical speed value, in units as above |
| Longitudinal Acceleration | A.116 LongitudinalAccelerationValue, LongitudianlAccelerationConfidence. ::= INTEGER (−160 . . . 161) |
| Lateral Acceleration | A.115. LateralAccelerationValue, lateralAccelerationConfidence |

The sending vehicle container may also include data elements with satellite positioning data, including pseudorange data, associated with a satellite ID and estimate of an unknown offset distance. Table 7 includes example data elements related to satellite positioning, for an implementation where a set of data elements is included for each pseudorange.

TABLE 7

Example satellite data elements for sending vehicle container

| Data Element | Description |
|---|---|
| Satellite pseudo-range | Distance between one satellite and the UE in m, with an unknown offset. |
| Satellite number | Satellite ID |
| Estimated offset distance | Estimate of the unknown offset in m |

Data elements for an RPM data container for Phase 3 messages are described above, and include the sender RangingInfo (the RangingID or RangingID plus transmitting AntennaID). This can be obtained from the sending vehicle container from the Phase 1 RPM message from the identified vehicle. The RPM data container data elements can also include the sender's transmission AntennaID if the RangingInfo does not include the AntennaID. The ToA of the ranging signal from that antenna is also included in the RPM data container.

ToA is calculated separately for each receiving antenna used for range determination. Different antennas may have significant spatial separation which leads to different ToAs. In practice, to reduce messaging, a receiver can select one receiving antenna to be used for ranging, and may only calculate ToA for that particular antenna.

Table 8 shows an example RPM data container, for an implementation where a data container for each heard sender (neighbor vehicle) is used.

TABLE 8

Example RPM data container

| Data element | Description |
|---|---|
| Sender RangingInfo | Ranging vehicle ID or Ranging vehicle ID plus its TXantenna ID. Set to the one from the Ph1 message sent by the peer UE. As taken from the RPM-Ph1 Sending Vehicle Container |
| Sender's TXAntennaID | If the Ranginginfo above does NOT contain the TXantennaID |
| TOA of ranging signal from that antenna | Range is [−4000 ns, 4000 ns] |

An alternative embodiment of an RPM data container uses one container for each of the vehicle's receive antennas: for each receive antenna there is a list of ToAs from Phase 2. The data elements include the receive AntennaID for the particular receiving antenna, and a sequence of one or more of the sending RangingInfo (RangingID or RangingID plus transmitting AntennaID), the sender's transmitting AntennaID if not included in the RangingInfo, and the ToA of the ranging signal from that antenna.

Table 9 shows an alternate example RPM data container, for an implementation where there is a container for each receiving antenna that includes ToAs for all heard senders.

TABLE 9

Example alternate RPM data container

| Data Element | Description |
| --- | --- |
| My RX AntennaID | Antenna ID from the accompanying "sending vehicle container" |
| Sequence of one or more: | |
| Sender TXAntennaID | If the RangingInfo does not contain the TXAntennaID. |
| ToA of ranging signal from that antenna | Range is [−4000 ns, 4000 ns] |

FIGS. 9 and 10 show examples of ranging information for a distributed ranging technique, for an implementation where the RPM data container of Table 8 is used for Phase 3 time of arrival messages (FIG. 9) and for an implementation where the RPM data container of Table 9 is used (FIG. 10). For these examples, the ego vehicle is first vehicle 110-a of FIG. 1, while two neighbor vehicles 110-b and 110-c participate in the distributed ranging process with vehicle 110-a.

In FIG. 9, the RangingID of vehicle 110-a is 0x12345678, and the AntennaIDs for its four transmitting antennas 215-a to 215-d are 0x1, 0x2, 0x3, and 0x4, while it receives signals using two of the four antennas, antennas 215-a and 215-d, with AntennaIDs 0x1 and 0x4. Note that all of these IDs are for illustration only and other formats, sizes, configurations, etc. can be used. The transmission triplets for vehicle 110-a include the AntennaID, SequenceID, and ResrcIndx.

The RangingID of vehicle 110-b is 0x55443322, and the AntennaIDs for its (two) transmitting antennas are 0xa and 0xb, while the RangingID of vehicle 110-c is 0xabcd1111, and the AntennaIDs for its (three) transmitting antennas are 0x6, 0x4, and 0x5.

Vehicle 110-a stores its own ranging signal parameters, which can be self-configured, and also stores the ranging signal parameters for vehicles 110-b and 110-c after receiving Phase 1 vehicle information messages from those vehicles.

During Phase 2, vehicle 110-a receives ranging signals from vehicles 110-b and 110-c on antennas 215-a and 215-d and measures the ToAs. Using the resource information and sequence information received during Phase 1, it associates the ToAs with the correct RangingIDs and AntennaIDs for vehicles 110-b and 110-c, and sends a report to the upper layer to generate the Phase 3 time of arrival message. At the upper layer, vehicle 110-a generates a Phase 3 time of arrival message that includes a data container such as RPM data container of Table 8. In the example of FIG. 6, there is one data container for each heard sender (vehicles 110-b and 110-c) for all receiving antennas.

In FIG. 10, a RangingInfo parameter is used that indicates both the identity of the vehicle and the identity of the transmitting antenna, and the radio information is a couplet of RsrcIndx and SequenceID. As with FIG. 9, vehicle 110-a stores its own ranging signal parameters and stores RangingInfo and RadioInfo for neighbor vehicles 110-b and 110-c after receiving Phase 1 vehicle information messages.

During Phase 2, vehicle 110-a receives ranging signals from vehicles 110-b and 110-c on antennas 215-a and 215-d and measures the ToAs. Using the resource information and sequence information received during Phase 1, it associates the ToAs with the correct RangingInfo for vehicles 110-b and 110-c, and sends a report to the upper layer to generate the Phase 3 time of arrival message. At the upper layer, vehicle 110-a generates a Phase 3 time of arrival message that includes a data container such as RPM data container of Table 9. In the example of FIG. 10, there is a data container for each receiving antenna that includes the time of arrival information for all heard senders.

The above describes techniques for distributed positioning/ranging. Distributed ranging/positioning allows for operation without the need for network participation. However, in some cases a centralized ranging/positioning technique may be able to provide higher accuracy.

Figure 11:
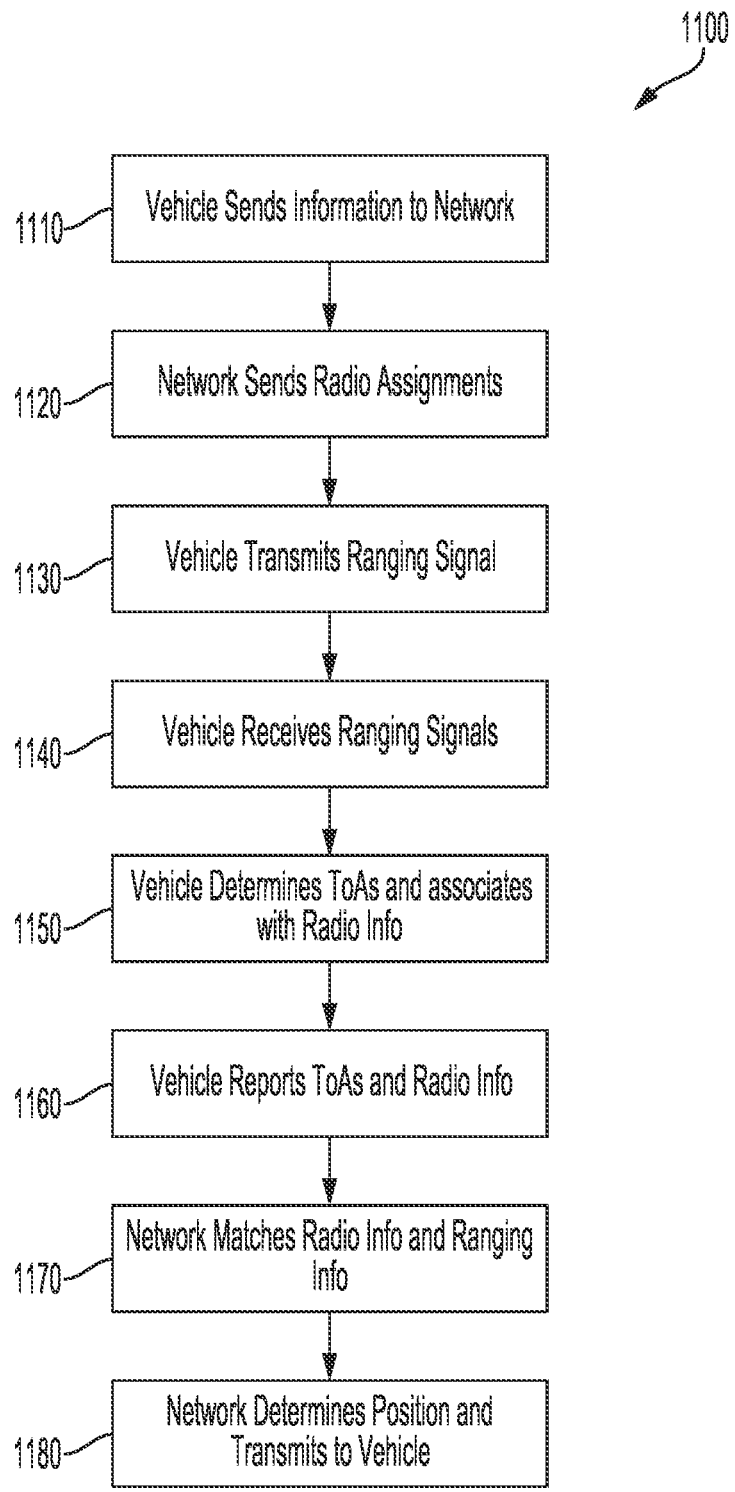
FIG. 11 shows an example multi-phase technique for centralized ranging.

In a centralized ranging technique, the network actively participates in the multi-phase ranging/positioning process. FIG. 11 shows a representation of an example multi-phase ranging technique 1100 for centralized ranging, which can provide accurate range and/or position measurements. Technique 1100 can be used, for example, in response to initiation of a positioning application for autonomous driving.

Referring to FIG. 1 and FIG. 11, at 1110, first vehicle 110-a sends a message to access point 140 with vehicle information such as one or more of vehicle identifier information, information indicative of one or more antenna location offsets from a vehicle reference point for one or more vehicle antennas for the antennas to be used for ranging, and self-location information. The vehicle information can also include its device type (RSU or vehicle). In some implementations, vehicle 110-a can send its information to the network during a time interval referred to as Phase 1, while in others it can send the information at a different time. Although the time intervals for centralized ranging are referred to with similar labels, some or all of the actions occurring during the phases can be different than for distributed ranging. At 1120, during Phase 1, the network configures radio information for vehicle 110-a (and other vehicles), where the radio information includes sequence IDs and resources for sequence transmission by each antenna, and sends a Phase 1 network message with this information to vehicle 110-a. If the Phase 1 network message is broadcast, then the centralized ranging process is similar to the distributed ranging process. If the Phase 1 network message is unicast, then the Phase 3 centralized time of arrival message is different since the PHY index needs to be reported (the resource and sequence information associated with each measured ToA).

If the ranging signal bandwidth is not pre-configured, the network can also configure vehicle 110-a with a ranging signal bandwidth. The network entity that configures vehicle 110-a can be either access point 140 (e.g., gNB), or the core network. In some implementations, access point 140 assigns the sequences/resources and sends them to a third party, and the third party server does the ranging computation.

At 1130, during a second time interval referred to as Phase 2 or ranging signal interval, vehicle 110-a transmits ranging signal sequences according to the configuration, in the same manner that ranging signals are transmitted during Phase 2 of the distributed ranging technique described above. At 1140, also during Phase 2, vehicle 110-a receives ranging signals from neighbor vehicles such as vehicle 110-b and vehicle 110-c and/or other neighbor devices, such as RSU 120 or cell phone 130. At 1150, vehicle 110-a determines ToAs of received ranging signals using the measurement process described above in the distributed ranging section, and associates the ToAs with the resources and sequences of the received signals. If the network message was broadcast, vehicle 110-a can report measured ToAs and associated ranging information (e.g., RangingID) for the ranging signals received from neighbor vehicles such as vehicle 110-b and 110-c, as with the distributed ranging process above. However, if the network message was unicast (so that each vehicle is able to access only its own radio assignments), vehicle 110-a does not have ranging information and radio information for the neighbor vehicles and cannot associate the received signals with their transmitting vehicles. Instead it reports the time of arrival and associated resource and signal information to the network.

At 1160, during a third time interval referred to as Phase 3, vehicle 110-a reports radio resources and sequences and the associated measured ToAs of ranging signals from other vehicles, self-location, and optionally measured pseudoranges to satellites. Phase 3 of the centralized ranging technique is similar to Phase 3 for the distributed ranging technique, but the ToA information is transmitted to access point 140 with the radio resources and sequences rather than the RangingIDs of neighbor vehicles.

As noted above, if the Phase 1 network message is unicast, the Phase 3 time of arrival message will be different for centralized ranging. For a unicast message, the sending vehicle container is the same, but the data container is different. The Phase 3 time of arrival message from vehicle 110-a to access point 140 can't contain the ranging information of the vehicles that send the ranging signals, because the Phase 1 messages were unicast and not heard by other vehicles. Instead, the Phase 3 time of arrival messages contain pairs of (RadioInfo, ToA), where the RadioInfo includes transmission resources and sequence ID. A timestamp that indicates the time at the generation of the ToA may be included to aid the network in processing the received time of arrival messages.

At 1170, the network node (e.g., access point 140) matches the (RadioInfo) to the RangingInfo of a neighbor vehicle (or other device) located near vehicle 110-a that was assigned those resources and ZC SequenceID. Since there are a limited number of resources and sequences to be used for ranging signals, the network needs to manage resource assignment to prevent incorrect identification of the RangingInfo for a particular ToA. In some implementations, vehicle 110-a can report the identity of the entity that assigned it resources, such as the eNB or cell ID, and the network node can use this information to determine which RangingInfo should be associated with a particular ToA if there is ambiguity due to multiple vehicles using the same resources.

In a centralized ranging process, neighboring network nodes (e.g., neighbor access points) should manage resources to retain the uniqueness of assigned pairs of TX resources index and ZC sequence ID within at least a geographical positioning range. That is, there should be only one "first" RangingID per (Tx resource index, ZC SequenceID) in an area. That resource pair can be reused for a different vehicle only if the different vehicle is far enough from the first RangingID. In some cases, the positioning range can be pre-configured by the network, since it depends on the carrier used. Additionally, the positioning range should be smaller for slow, dense traffic than for rural or suburban environments.

At 1180, during a fourth time interval 1140, referred to as Phase 4, the network estimates ranges and/or positions for vehicle 110-a based on the reported ToAs of the ranging signals received at vehicle 110-a from neighbor vehicles and RSUs (e.g., from vehicle 110-b, vehicle 110-c, RSU 120, and cell phone 130), ToAs of the ranging signals transmitted from vehicle 110-a and received at neighbor vehicles that are reported back to the network using an access point such as access point 140, and optionally other position information such as the satellite pseudoranges. Access point 140 can transmit the network-calculated position estimate to vehicle 110-a (as well as estimates for other neighbor vehicles).

Figure 12:
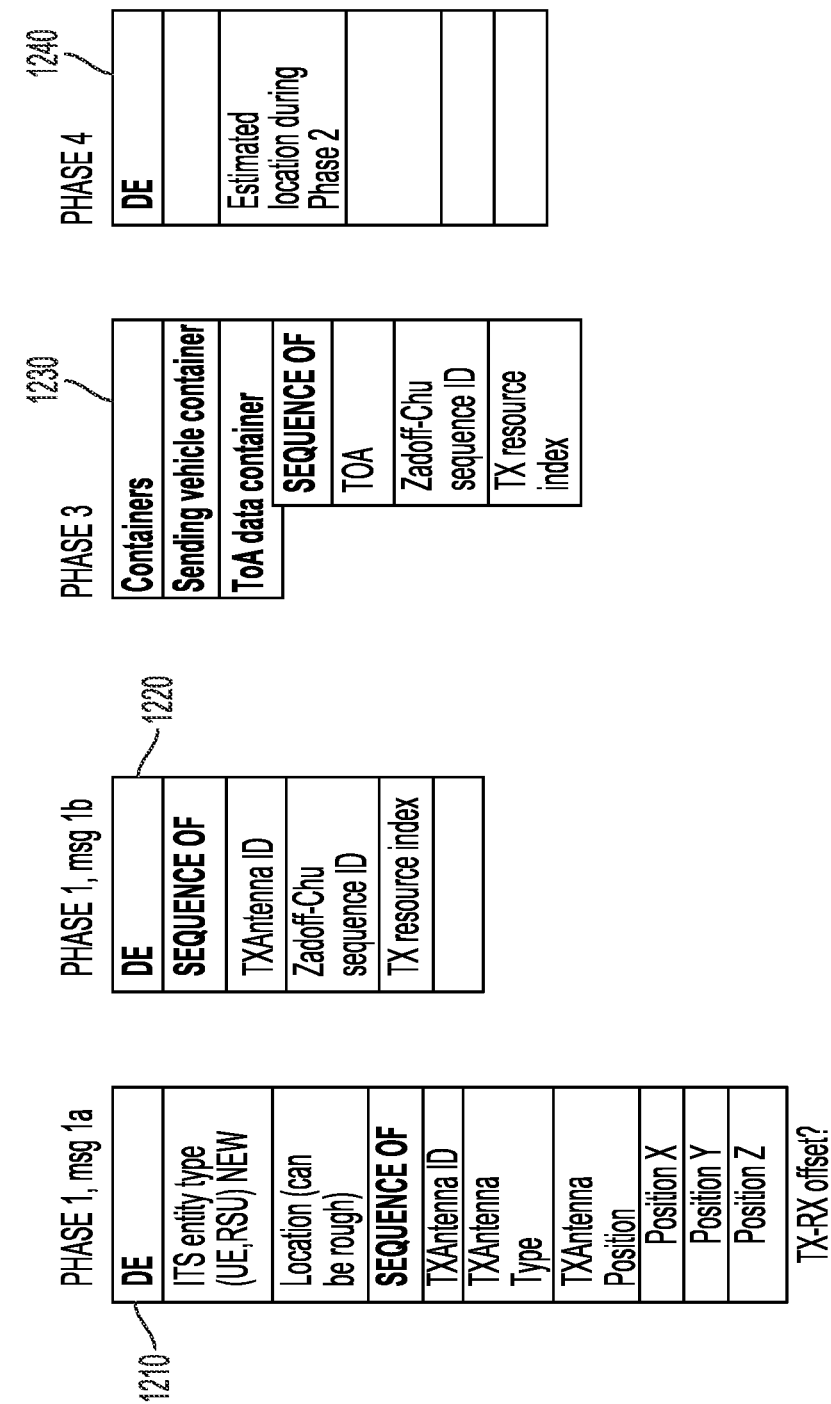
FIG. 12 shows data elements for vehicle-network messaging.

In some implementations, Phase 1, 3 and 4 messages are ITS messages, while the Phase 2 ranging signal is a physical-layer broadband ranging signal as described above with respect to the distributed ranging technique. FIG. 12 shows the data elements 1210 for the message from vehicle 110-a to access point 140 and data elements 1220 for the message from the access point 140 to vehicle 110-a, which both occur during Phase 1. Data elements 1210 include an ITS entity type, which indicates if the entity is a vehicle or RSU, and an indication of a location (which need not be precise). A sequence of transmitting AntennaID, transmitting AntennaType, and transmitting AntennaPosition (e.g., x, y, and z coordinates of the antenna with respect to a reference point on the vehicle).

The message from access point 140 to vehicle 110-a includes assignment of the radio information for the transmitting antennas. For example, data elements 1220 include a sequence of transmit AntennaID, Zadoff-Chu SequenceID, and transmission resource index.

The Phase 3 message includes containers 1230, including a sending vehicle container 1232 and ToA data container 1234. The Phase 3 message includes information obtained from received Phase 2 signals from other vehicles and/or RSUs. Although vehicle 110-a does not have information about the sender's identity, since the network assigned (or otherwise has knowledge of) particular sequence ids and transmission resources to all of the participating vehicles and RSUs in a geographical area, it can associate the ToAs with the correct Z-C SequenceID and transmission resource index, and thus to the sending vehicle/RSU. The ToA data container includes a sequence of ToA, Z-C SequenceID, and transmission resource index.

A Phase 4 message includes at least data element 1240, which is an estimate of vehicle 110-a's location during Phase 2.

Figure 13:
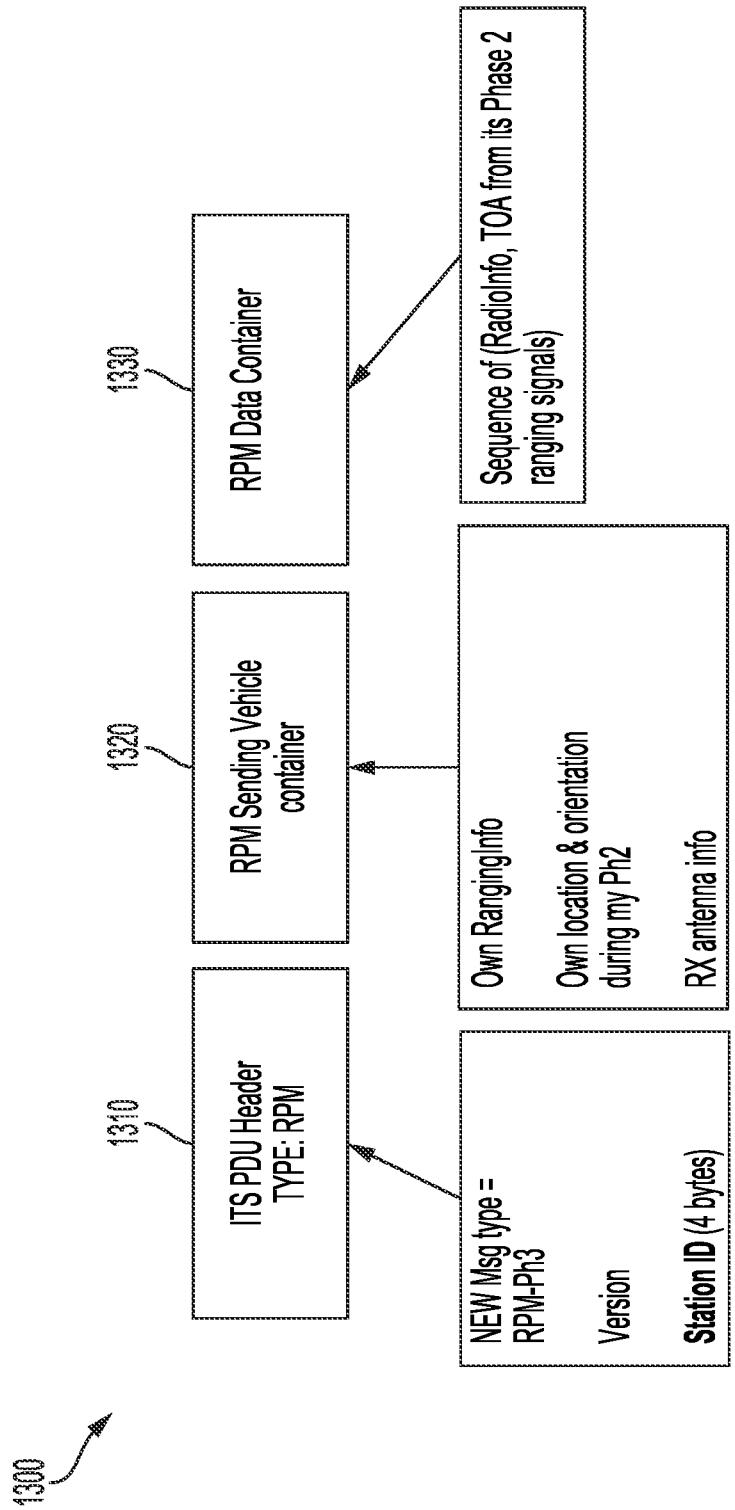
FIG. 13 shows a diagram of a Ranging Proto Message (RPM) for centralized ranging.

Existing protocols and data elements can also be used for Phase 3 ranging messages for centralized ranging techniques. FIG. 13 shows a diagram 1300 of a new Ranging Proto Message (RPM) for centralized ranging. As with distributed ranging, the RPM uses ITS protocol and data elements from ETSI-ITS (102.894-2) for Phase 3 ranging messages. Format and encoding for data elements is re-used; e.g., for vehicle position, timestamp, and antenna information data elements. New data elements may be added as needed. In some implementations, the security header/trailer included in other ITS message types may be omitted.

An ITS PDU header 1310 identifies the message as having an RPM message type. RPM sending vehicle container 1320 includes the vehicle's RangingInfo, the vehicle's location and orientation during Phase 2, and the vehicle's receive antenna information. RPM data container 1330 includes the Phase 3 information; for example, a sequence of (RadioInfo, List of ToAs from its Phase 2 ranging signals).

Data container 1330 includes a transmission resource index, including subframe number and symbol number. For an example where there are 16 subframes with 14 symbols in each subframe, four bits are needed to indicate the subframe and four bits are needed to indicate the symbol number. As noted above, this is technology specific. Data container 1330 includes a Z-C SequenceID. Data container 1330 also includes the calculated ToA of the ranging signal sent on that transmission resource with that Z-C SequenceID.

In some implementations, information received in CAMs may be used with Phase 3 RPM messaging. For example, the CAM vehicle information can be used so that it does not need to be sent in a Phase 3 RPM message. The Phase 3 RPM message and CAM message are associated using the Station ID in the ITS header. As noted above, static CAM information (such as vehicle dimension information) can be accessed from any CAM, while dynamic CAM information (such as vehicle speed) should be obtained from a CAM sent closest in time to the Phase 3 RPM message.

For the above techniques, ToA calculation can be performed in the physical layer. As described above, the ranging techniques described herein use the ToAs to determine range or position. In the distributed technique, vehicle 110-a uses ToAs for signals received from other vehicles and RSUs, as well as ToAs for its own Phase 2 ranging signals received at other vehicles and RSUs that are reported in received Phase 3 messages.

At vehicle 110-a, each ToA is an estimated arrival time of signals from other vehicles such as vehicle 110-b and 110-c, RSU 120 or cell phone 130, along the earliest path to each receiving antenna. The ToA is calculated with respect to vehicle 110-a's local clock. In general, the local clock at one device will differ from the local clock at a different device. That is, each vehicle has a different notion of when a given symbol starts. This is referred to as the timing or clock offset between two UEs (vehicles). E.g. the clock offset $T_{off}$ between the local clock $t_1$ for vehicle 110-a and the local clock $t_2$ for vehicle 110-b may be 2 μs.

Vehicle 110-b will report the ToA for a signal received from vehicle 110-a as a value in the valid ToA range; for example, between −4000 ns and 4000 ns. The ToA indicates the distance d between vehicle 110-a and vehicle 110-b, where the ToA=d/c+/−$T_{off}$, with the speed of light being designated by c. Offsets of a few μs are typical, and are accommodated by the TOA range [−4000 ns, 4000 ns]. For each vehicle pair, the round trip time (RTT)=2 d/c. RTT is typically reported in ns.

Figure 14:
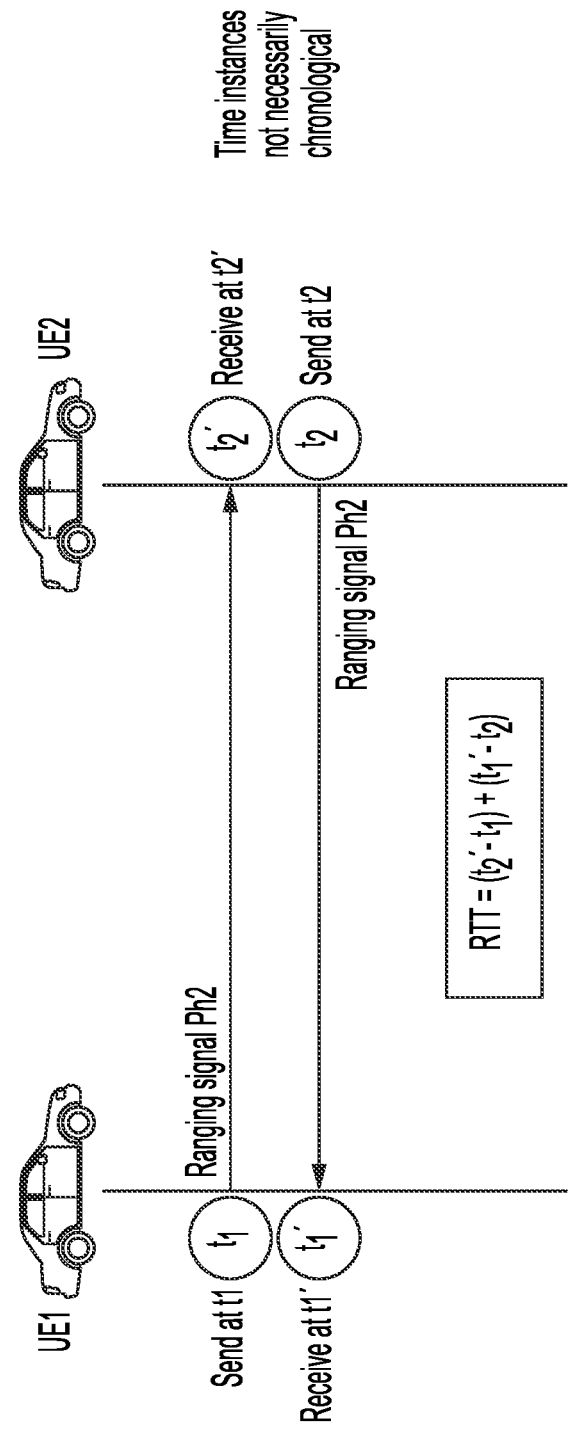
FIG. 14 shows a diagram of Round Trip Time (RTT) calculation.

The clock offset can be cancelled after receiving the ToAs. FIG. 14 shows a diagram of a computation of RTT for vehicle 110-a and vehicle 110-b. A ranging signal sent from vehicle 110-a at $t_1$ is received at vehicle 110-b at $t_2$', while a ranging signal sent from vehicle 110-b at $t_2$ is received at vehicle 110-a at $t_1$'. RTT is computed as the sum of the differences as follows: vehicle 110-a measures the ToA of the signal that arrives from vehicle 110-b at $t_1$', and knows $t_2$ based on the Phase 1 signal from vehicle 110-b that indicates the resource symbol for the vehicle 110-b transmission (the transmission resource information). Vehicle 110-a receives Phase 3 messages from vehicle 110-b, and knows the ToA determined at vehicle 110-b based on its ranging signal as received by vehicle 110-b. Because the clock bias acts to increase the measured time over the "true" measured time for one of the measurements and to decrease the measured time for the other measurement, the clock bias is cancelled out in an RTT measurement. Once RTT is computed, the range d is (RTT*c)/2.

For an implementation that uses the range alone, either the ToA measurement or the RTT measurement may be used. In RTT measurements, the clock offset is automatically cancelled, while for range measurement based on ToA the clock offset can be estimated, determined in a different way, or the measurement will have an inaccuracy equal to $t_{off}$/c. To compensate for, or cancel, the clock offset of different devices, devices can broadcast measured ToAs and optionally their own TX/RX chain delays on each of antenna. Alternatively, a vehicle may internally adjust the ToA measurements using its TX/RX chain delay.

It should be noted that these methods describe possible implementation, and that the operations and the steps may be rearranged or otherwise modified such that other implementations are possible. For example, in some cases information about a vehicle or other device can be provided after the ranging signals are transmitted rather than before, as long as the information is available when needed to determine ToAs or to associate the ToAs with the correct device. In some examples, aspects from two or more of the methods may be combined. For example, aspects of each of the methods may include steps or aspects of the other methods, or other steps or techniques described herein. For example, centralized ranging and distributed ranging can be used at different times by the same vehicle.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. The term "processor" is used according to its meaning as structure and not software per se. The phrase "computer readable medium" and similar phrases do not refer to transitory propagating signals. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A computer storage medium may be any available medium that can be accessed by a general purpose or special purpose computer but the phrase "computer storage medium" does not refer to a transitory propagating signal. By way of example, and not limitation, computer storage media can comprise RAM, ROM, electrically erasable programmable read only memory (EEPROM), compact disk (CD) ROM or other optical disk storage, magnetic disk storage or other magnetic storage devices, or other medium that can be used to store desired program code means in the form of instructions or data structures and that can be accessed by a general-purpose or special-purpose computer, or a general-purpose or special-purpose processor. Also, a connection that transmits information is referred to as a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium.

The techniques herein are described with reference to systems that use wide bands, such as 5G or new radio (NR) systems and future systems that use spectrum in the mmW range of the electromagnetic spectrum. If applicable, techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes a 5G system for purposes of example, and 5G terminology is used in much of the description above, although the techniques are applicable beyond 5G applications.

Base stations may include or may be referred to by those skilled in the art as a base transceiver station, a radio base station, an access point (AP), a radio transceiver, a NodeB, eNodeB (eNB), Home NodeB, a Home eNodeB, gNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for carrier aggregation signaling. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same or similar reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communications at a user equipment, comprising:
    during a first time interval, receiving one or more information messages from one or more user equipments, each of the one or more information messages including a respective identifier associated with a respective user equipment of the one or more user equipments and respective radio information including ranging signal transmission resources for the respective user equipment;
    during the first time interval, transmitting an information message for the user equipment, the information message including an identifier associated with the user equipment and radio information including ranging signal transmission resources for the user equipment;
    during a second time interval, transmitting ranging signals to the one or more user equipments using the ranging signal transmission resources for the user equipment;
    during the second time interval, receiving ranging signals from the one or more user equipments, each of the ranging signals associated with the ranging signal transmission resources for the respective user equipment; and
    during a third time interval, transmitting a set of measurements, each measurement associated with a respective ranging signal and based at least in part on the ranging signal transmission resources for the respective user equipment.

2. The method of claim 1, wherein the identifier includes an indication that the user equipment is included in a fixed device.

3. The method of claim 2, wherein the user equipment is included in a roadside unit (RSU), and wherein the indication that the user equipment is included in a fixed device comprises an indication that the user equipment is included in the RSU.

4. The method of claim 3, wherein the information message for the user equipment further includes location information for the RSU.

5. The method of claim 1, wherein the user equipment is included in a vehicle, and wherein the identifier includes a vehicle identifier.

6. The method of claim 5, wherein the identifier further includes an identification of one or more transmitting antennas of the vehicle.

7. The method of claim 1, wherein the radio information further includes one or more sequence identifiers, wherein each of the one or more sequence identifiers identifies a bit sequence to be transmitted by one or more antennas of the user equipment.

8. The method of claim 1, wherein the radio information comprises resource indices of the ranging signal transmission resources.

9. The method of claim 1, wherein the second time interval comprises a plurality of ranging sub-cycles, and wherein the radio information comprises an indication of a transmission slot included in a sub-cycle of the second time interval.

10. A user equipment comprising:
    memory circuitry; and
    processor circuitry, wherein the memory circuitry and processor circuitry are configured to:
        during a first time interval, receive one or more information messages from one or more user equipments, each of the one or more information messages including a respective identifier associated with a respective user equipment of the one or more user equipments and respective radio information including ranging signal transmission resources for the respective user equipment;
        during the first time interval, transmit an information message for the user equipment, the information message including an identifier associated with the user equipment and radio information including ranging signal transmission resources for the user equipment;
        during a second time interval, transmit ranging signals to the one or more user equipments using the ranging signal transmission resources for the user equipment;
        during the second time interval, receive ranging signals from the one or more user equipments, each of the ranging signals associated with the ranging signal transmission resources for the respective user equipment; and
        during a third time interval, transmit a set of measurements, each measurement associated with a respective ranging and based at least in part on the ranging signal transmission resources for the respective user equipment.

11. The user equipment of claim 10, wherein the identifier includes an indication that the user equipment is included in a fixed device.

12. The user equipment of claim 11, wherein the user equipment is configured to be included in a roadside unit (RSU), and wherein the indication that the user equipment is included in a fixed device comprises an indication that the user equipment is included in the RSU.

13. The user equipment of claim 12, wherein the information message for the user equipment further includes location information for the RSU.

14. The user equipment of claim 10, wherein the user equipment is configured to be included in a vehicle, and wherein the identifier includes a vehicle identifier.

15. The user equipment of claim 14, wherein the identifier further includes an identification of one or more transmitting antennas of the vehicle.

16. The user equipment of claim 10, wherein the radio information further includes one or more sequence identifiers, wherein each of the one or more sequence identifiers identify a bit sequence to be transmitted by one or more antennas in communication with the user equipment.

17. The user equipment of claim 10, wherein the radio information comprises resource indices of the ranging signal transmission resources.

18. The user equipment of claim 10, wherein the second time interval comprises a plurality of ranging sub-cycles, and wherein the radio information comprises an indication of a transmission slot included in a sub-cycle of the second time interval.

19. A user equipment comprising:
means for receiving one or more information messages from one or more user equipments during a first time interval, each of the one or more information messages including a respective identifier associated with a respective user equipment of the one or more user equipments and respective radio information including ranging signal transmission resources for the respective user equipment;
means for transmitting an information message for the user equipment during the first time interval, the information message including an identifier associated with the user equipment and radio information including ranging signal transmission resources for the user equipment;
means for transmitting ranging signals to the one or more user equipments using the ranging signal transmission resources for the user equipment during a second time interval;
means for receiving ranging signals from the one or more user equipments, each of the ranging signals associated with the ranging signal transmission resources for the respective user equipment during the second time interval; and
means for transmitting a set of measurements during a third time interval, each measurement associated with a respective ranging signal and based at least in part on the ranging signal transmission resources for the respective user equipment.

20. The user equipment of claim 19, wherein the identifier includes an indication that the user equipment is included in a fixed device.

21. The user equipment of claim 20, wherein the user equipment is configured to be included in a roadside unit (RSU), and wherein the indication that the user equipment is included in a fixed device comprises an indication that the user equipment is included in the RSU.

22. The user equipment of claim 21, wherein the information message for the user equipment further includes location information for the RSU.

23. A roadside unit comprising:
one or more antennas;
memory circuitry; and
processor circuitry, wherein the memory circuitry, processor circuitry, and one or more antennas are configured to:
during a first time interval, receive one or more information messages from one or more user equipments, each of the one or more information messages including a respective identifier associated with a respective user equipment of the one or more user equipments and respective radio information including ranging signal transmission resources for the respective user equipment;
during the first time interval, transmit an information message for the roadside unit, the information message including an identifier associated with the roadside unit and radio information including ranging signal transmission resources for the roadside unit;
during a second time interval, transmit ranging signals to the one or more user equipments using the ranging signal transmission resources for the roadside unit;
during the second time interval, receive ranging signals from the one or more user equipments, each of the ranging signals associated with the ranging signal transmission resources for the respective user equipment; and
during a third time interval, transmit a set of measurements, each measurement associated with a respective ranging signal and based at least in part on the ranging signal transmission resources for the respective user equipment.

24. The roadside unit of claim 23, wherein the identifier indicates a roadside unit.

25. The roadside unit of claim 23, wherein the information message for the roadside unit further includes location information for the roadside unit.

* * * * *